US010190681B2

United States Patent
Niii et al.

(10) Patent No.: US 10,190,681 B2
(45) Date of Patent: Jan. 29, 2019

(54) CONTROL SYSTEM FOR POWER TRANSMISSION DEVICE FOR VEHICLE

(71) Applicant: TOYOTA JIDOSHA KABUSHIKI KAISHA, Toyota-shi, Aichi-ken (JP)

(72) Inventors: Daisuke Niii, Okazaki (JP); Takemichi Isono, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/644,068

(22) Filed: Jul. 7, 2017

(65) Prior Publication Data
US 2018/0023700 A1 Jan. 25, 2018

(30) Foreign Application Priority Data
Jul. 21, 2016 (JP) .................. 2016-143788

(51) Int. Cl.
*F16H 61/14* (2006.01)
*F16H 59/46* (2006.01)

(52) U.S. Cl.
CPC ..... *F16H 61/143* (2013.01); *F16H 2059/465* (2013.01); *F16H 2061/145* (2013.01)

(58) Field of Classification Search
CPC ........................... F16H 61/14; F16H 2061/145
See application file for complete search history.

(56) References Cited

U.S. PATENT DOCUMENTS

| 6,341,679 | B1 | 1/2002 | Abe et al. |
| 2010/0312444 | A1 | 12/2010 | Takamatsu et al. |
| 2012/0325614 | A1* | 12/2012 | Yamashita ............... F16H 45/02 192/70.14 |
| 2014/0163802 | A1* | 6/2014 | Tokai ....................... F16H 61/14 701/22 |
| 2016/0123247 | A1* | 5/2016 | Mizoguchi ............ B60W 10/06 123/406.55 |

FOREIGN PATENT DOCUMENTS

| CN | 101922553 A | 12/2010 |
| JP | S59-158757 U1 | 10/1984 |
| JP | 2001-065685 A | 3/2001 |
| JP | 2006-226333 A | 8/2006 |
| JP | 2010-286008 A | 12/2010 |
| JP | 2012-107708 A | 6/2012 |

* cited by examiner

Primary Examiner — Edwin A Young
(74) Attorney, Agent, or Firm — Oliff PLC

(57) ABSTRACT

A protection control selection unit is provided. The protection control selection unit selects control that uses one of a completely engaging heat generation amount and a releasing heat generation amount, by which the amount of heat that is generated in a lockup clutch is reduced. The completely engaging heat generation amount is generated in the lockup clutch in a period before the lockup clutch is completely engaged from a state of lockup engagement control. The releasing heat generation amount is generated in the lockup clutch in a period before the lockup clutch is released from the state of the lockup engagement control. Thus, an increase in the temperature of the lockup clutch at the time when the lockup clutch is completely engaged or released from the state of the lockup engagement control is suitably suppressed.

10 Claims, 8 Drawing Sheets

CONTROL SYSTEM FOR POWER TRANSMISSION DEVICE FOR VEHICLE

INCORPORATION BY REFERENCE

The disclosure of Japanese Patent Application No. 2016-143788 filed on Jul. 21, 2016 including the specification, drawings and abstract is incorporated herein by reference in its entirety.

BACKGROUND

1. Technical Field

The disclosure relates to a technique for suitably suppressing an increase in the temperature of a lockup clutch in a control system for a power transmission device for a vehicle, the power transmission device being able to, when the integrated amount of heat that is generated in the lockup clutch becomes larger than or equal to a predetermined heat generation amount determination value during engagement control over the lockup clutch, select any one of first control for completely engaging the lockup clutch from the state of the engagement control and second control for releasing the lockup clutch from the state of the engagement control.

2. Description of Related Art

There is known a control system for a power transmission device for a vehicle. The power transmission device includes a fluid coupling that is able to directly couple an input member to an output member by engaging a lockup clutch. The control system includes a lockup clutch control unit and an integrated heat generation amount calculation unit. The lockup clutch control unit executes engagement control for controlling an engaging pressure of the lockup clutch such that the lockup clutch is half-engaged. The integrated heat generation amount calculation unit calculates the integrated amount of heat that is generated in the lockup clutch during the engagement control. When the integrated amount of heat generated, calculated by the integrated heat generation amount calculation unit, becomes larger than or equal to a predetermined heat generation amount determination value, the control system is able to select any one of first control for completely engaging the lockup clutch from the state of the engagement control and second control for releasing the lockup clutch from the state of the engagement control. This is, for example, a control system for a power transmission device for a vehicle, described in Japanese Patent Application Publication No. 2001-065685 (JP 2001-065685 A). JP 2001-065685 A describes as follows. The surface temperature of a clutch friction material in a lockup clutch is calculated during engagement operation control (particularly, slip control) over a lockup clutch. The surface temperature of the clutch friction material is compared with a predetermined first allowable temperature. When it is determined that the surface temperature of the clutch friction material is higher than or equal to the first allowable temperature, the lockup clutch is completely engaged from the state of the engagement operation control or the lockup clutch is released from the state of the engagement operation control. By completely engaging the lockup clutch from the state of the engagement operation control or releasing the lockup clutch from the state of the engagement operation control, it is possible to suitably reduce heat that is generated in the lockup clutch thereafter.

SUMMARY

In JP 2001-065685 A, for example, it is conceivable to execute slip control over the lockup clutch in order to suitably reduce shock at the time when the lockup clutch is completely engaged or released from the state of the engagement operation control. However, an increase in the surface temperature of the clutch friction material from the first allowable temperature varies between the case where the lockup clutch is completely engaged from the state of the engagement operation control and the case where the lockup clutch is released from the state of the engagement operation control. For this reason, there is an inconvenience that the temperature of the lockup clutch can be remarkably high depending on whether the lockup clutch is completely engaged or released.

The disclosure provides a control system for a power transmission device for a vehicle, which suitably suppresses an increase in the temperature of a lockup clutch at the time when the lockup clutch is completely engaged or released.

An aspect of the disclosure provides a control system for a power transmission device for a vehicle. The power transmission device includes a fluid coupling. The fluid coupling is configured to directly couple an input member to an output member when a lockup clutch is engaged. The control system includes a lockup clutch control unit and an integrated heat generation amount calculation unit. The lockup clutch control unit executes engagement control for controlling an engaging pressure of the lockup clutch such that the lockup clutch is half-engaged. The integrated heat generation amount calculation unit calculates an integrated amount of heat that is generated in the lockup clutch during the engagement control. When the integrated amount of heat generated, calculated by the integrated heat generation amount calculation unit, becomes larger than or equal to a predetermined heat generation amount determination value, the control system is configured to select one of first control for completely engaging the lockup clutch from a state of the engagement control and second control for releasing the lockup clutch from the state of the engagement control. The control system includes a selection unit. When the integrated amount of heat generated, calculated by the integrated heat generation amount calculation unit, becomes larger than or equal to the heat generation amount determination value, the selection unit selects one of first control and second control, by which the amount of heat that is generated in the lockup clutch is reduced. The first control uses a completely engaging heat generation amount that is generated in the lockup clutch in a period from when the integrated amount of heat generated becomes larger than or equal to the heat generation amount determination value after a start of the engagement control to when the lockup clutch is completely engaged. The second control uses a releasing heat generation amount that is generated in the lockup clutch in a period from when the integrated amount of heat generated becomes larger than or equal to the heat generation amount determination value after the start of the engagement control to when the lockup clutch is released.

In the above aspect, the selection unit may include a heat generation amount estimation unit. The heat generation amount estimation unit estimates the completely engaging heat generation amount and the releasing heat generation amount by using at least one of a rotational difference between the input member and the output member at the time when the integrated amount of heat generated, calculated by the integrated heat generation amount calculation unit, becomes larger than or equal to the heat generation amount determination value and the engaging pressure of the lockup clutch at the time when the integrated amount of heat generated, calculated by the integrated heat generation amount calculation unit, becomes larger than or equal to the heat generation amount determination value. The selection unit may compare the completely engaging heat generation amount estimated by the heat generation amount estimation unit with the releasing heat generation amount estimated by the heat generation amount estimation unit, and may select one of the first control and the second control, by which the amount of heat that is generated in the lockup clutch is reduced.

In the above aspect, the selection unit may select the first control when a rotational difference between the input member and the output member at the time when the integrated amount of heat generated, calculated by the integrated heat generation amount calculation unit, becomes larger than or equal to the heat generation amount determination value is smaller than a predetermined rotational difference determination value or when the engaging pressure of the lockup clutch at the time when the integrated amount of heat generated, calculated by the integrated heat generation amount calculation unit, becomes larger than or equal to the heat generation amount determination value is higher than or equal to a predetermined engaging pressure determination value, and may select the second control when the rotational difference between the input member and the output member at the time when the integrated amount of heat generated, calculated by the integrated heat generation amount calculation unit, becomes larger than or equal to the heat generation amount determination value is larger than or equal to the rotational difference determination value and the engaging pressure of the lockup clutch at the time when the integrated amount of heat generated, calculated by the integrated heat generation amount calculation unit, becomes larger than or equal to the heat generation amount determination value is lower than the engaging pressure determination value. Thus, the amount of heat that is generated in the lockup clutch is reduced.

In the above aspect, the heat generation amount estimation unit may estimate the completely engaging heat generation amount such that the completely engaging heat generation amount increases with an increase in the rotational difference between the input member and the output member at the time when the integrated amount of heat generated, calculated by the integrated heat generation amount calculation unit, becomes larger than or equal to the heat generation amount determination value, and may estimate the releasing heat generation amount such that the releasing heat generation amount reduces with an increase in the rotational difference between the input member and the output member at the time when the integrated amount of heat generated, calculated by the integrated heat generation amount calculation unit, becomes larger than or equal to the heat generation amount determination value.

In the above aspect, the heat generation amount estimation unit may estimate the completely engaging heat generation amount such that the completely engaging heat generation amount reduces with an increase in the engaging pressure of the lockup clutch at the time when the integrated amount of heat generated, calculated by the integrated heat generation amount calculation unit, becomes larger than or equal to the heat generation amount determination value, and may estimate the releasing heat generation amount such that the releasing heat generation amount increases with an increase in the engaging pressure of the lockup clutch at the time when the integrated amount of heat generated, calculated by the integrated heat generation amount calculation unit, becomes larger than or equal to the heat generation amount determination value.

According to the above aspect, the control system includes the selection unit. When the integrated amount of heat generated, calculated by the integrated heat generation amount calculation unit, becomes larger than or equal to the heat generation amount determination value, the selection unit selects one of the first control and the second control, by which the amount of heat that is generated in the lockup clutch is reduced. The first control uses the completely engaging heat generation amount that is generated in the lockup clutch in a period from when the integrated amount of heat generated becomes larger than or equal to the heat generation amount determination value after a start of the engagement control to when the lockup clutch is completely engaged. The second control uses the releasing heat generation amount that is generated in the lockup clutch in a period from when the integrated amount of heat generated becomes larger than or equal to the heat generation amount determination value after the start of the engagement control to when the lockup clutch is released. For this reason, for example, when the releasing heat generation amount that is generated in the lockup clutch in the period from when the integrated amount of heat generated becomes larger than or equal to the heat generation amount determination value after the start of the engagement control to when the lockup clutch is released is larger than the completely engaging heat generation amount that is generated in the lockup clutch in the period from when the integrated amount of heat generated becomes larger than or equal to the heat generation amount determination value after the start of the engagement control to when the lockup clutch is completely engaged, the selection unit selects the first control by which the amount of heat that is generated in the lockup clutch is reduced as compared to the second control. On the other hand, for example, when the completely engaging heat generation amount that is generated in the lockup clutch in the period from when the integrated amount of heat generated becomes larger than or equal to the heat generation amount determination value after the start of the engagement control to when the lockup clutch is completely engaged is larger than the releasing heat generation amount that is generated in the lockup clutch in the period from when the integrated amount of heat generated becomes larger than or equal to the heat generation amount determination value after the start of the engagement control to when the lockup clutch is released, the selection unit selects the second control by which the amount of heat that is generated in the lockup clutch is reduced as compared to the first control. Thus, an increase in the temperature of the lockup clutch at the time when the lockup clutch is completely engaged or released from the state of the engagement control is suitably suppressed.

According to the above aspect, the selection unit includes the heat generation amount estimation unit. The heat generation amount estimation unit estimates the completely engaging heat generation amount and the releasing heat generation amount by using at least one of the rotational difference between the input member and the output member at the time when the integrated amount of heat generated, calculated by the integrated heat generation amount calculation unit, becomes larger than or equal to the heat generation amount determination value and the engaging pressure of the lockup clutch at the time when the integrated amount of heat generated, calculated by the integrated heat generation amount calculation unit, becomes larger than or equal to the heat generation amount determination value. The selection unit compares the completely engaging heat generation amount estimated by the heat generation amount estimation unit with the releasing heat generation amount estimated by the heat generation amount estimation unit, and selects one of the first control and the second control, by which the amount of heat that is generated in the lockup clutch is reduced. For this reason, for example, when the releasing heat generation amount estimated by the heat generation amount estimation unit is larger than the completely engaging heat generation amount estimated by the heat generation amount estimation unit, the selection unit selects the first control by which the amount of heat that is generated in the lockup clutch is reduced as compared to the second control. On the other hand, for example, when the completely engaging heat generation amount estimated by the heat generation amount estimation unit is larger than the releasing heat generation amount estimated by the heat generation amount estimation unit, the selection unit selects the second control by which the amount of heat that is generated in the lockup clutch is reduced as compared to the first control. Thus, an increase in the temperature of the lockup clutch at the time when the lockup clutch is completely engaged or released from the state of the engagement control is suitably suppressed.

According to the above aspect, the selection unit selects the first control when the rotational difference between the input member and the output member at the time when the integrated amount of heat generated, calculated by the integrated heat generation amount calculation unit, becomes larger than or equal to the heat generation amount determination value is smaller than the predetermined rotational difference determination value or when the engaging pressure of the lockup clutch at the time when the integrated amount of heat generated, calculated by the integrated heat generation amount calculation unit, becomes larger than or equal to the heat generation amount determination value is higher than or equal to the predetermined engaging pressure determination value, and selects the second control when the rotational difference between the input member and the output member at the time when the integrated amount of heat generated, calculated by the integrated heat generation amount calculation unit, becomes larger than or equal to the heat generation amount determination value is larger than or equal to the rotational difference determination value and the engaging pressure of the lockup clutch at the time when the integrated amount of heat generated, calculated by the integrated heat generation amount calculation unit, becomes larger than or equal to the heat generation amount determination value is lower than the engaging pressure determination value. Thus, the amount of heat that is generated in the lockup clutch is reduced. For this reason, for example, when the rotational difference between the input member and the output member is smaller than the rotational difference determination value or when the engaging pressure of the lockup clutch is higher than or equal to the engaging pressure determination value, that is, when the releasing heat generation amount is larger than the completely engaging heat generation amount, the selection unit selects the first control by which the amount of heat that is generated in the lockup clutch is reduced as compared to the second control. On the other hand, for example, when the rotational difference between the input member and the output member is larger than or equal to the rotational difference determination value and the engaging pressure of the lockup clutch is lower than the engaging pressure determination value, that is, when the completely engaging heat generation amount is larger than the releasing heat generation amount, the selection unit selects the second control by which the amount of heat that is generated in the lockup clutch is reduced as compared to the first control. Thus, an increase in the temperature of the lockup clutch at the time when the lockup clutch is completely engaged or released from the state of the engagement control is suitably suppressed.

According to the above aspect, the heat generation amount estimation unit estimates the completely engaging heat generation amount such that the completely engaging heat generation amount increases with an increase in the rotational difference between the input member and the output member at the time when the integrated amount of heat generated, calculated by the integrated heat generation amount calculation unit, becomes larger than or equal to the heat generation amount determination value, and estimates the releasing heat generation amount such that the releasing heat generation amount reduces with an increase in the rotational difference between the input member and the output member at the time when the integrated amount of heat generated, calculated by the integrated heat generation amount calculation unit, becomes larger than or equal to the heat generation amount determination value. For this reason, it is possible to suitably estimate the amount of heat that is generated in the lockup clutch by using the rotational difference between the input member and the output member at the time when the integrated amount of heat generated, calculated by the integrated heat generation amount calculation unit, becomes larger than or equal to the heat generation amount determination value.

According to the above aspect, the heat generation amount estimation unit estimates the completely engaging heat generation amount such that the completely engaging heat generation amount reduces with an increase in the engaging pressure of the lockup clutch at the time when the integrated amount of heat generated, calculated by the integrated heat generation amount calculation unit, becomes larger than or equal to the heat generation amount determination value, and estimates the releasing heat generation amount such that the releasing heat generation amount increases with an increase in the engaging pressure of the lockup clutch at the time when the integrated amount of heat generated, calculated by the integrated heat generation amount calculation unit, becomes larger than or equal to the heat generation amount determination value. For this reason, it is possible to suitably estimate the amount of heat that is generated in the lockup clutch by using the engaging pressure of the lockup clutch at the time when the integrated amount of heat generated, calculated by the integrated heat generation amount calculation unit, becomes larger than or equal to the heat generation amount determination value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a first embodiment of the disclosure will be described in detail with reference to the accompanying drawings. In the following embodiment, the drawings are simplified or modified where appropriate, and the scale ratio, shape, and the like, of each portion are not always accurately drawn.

Figure 1:
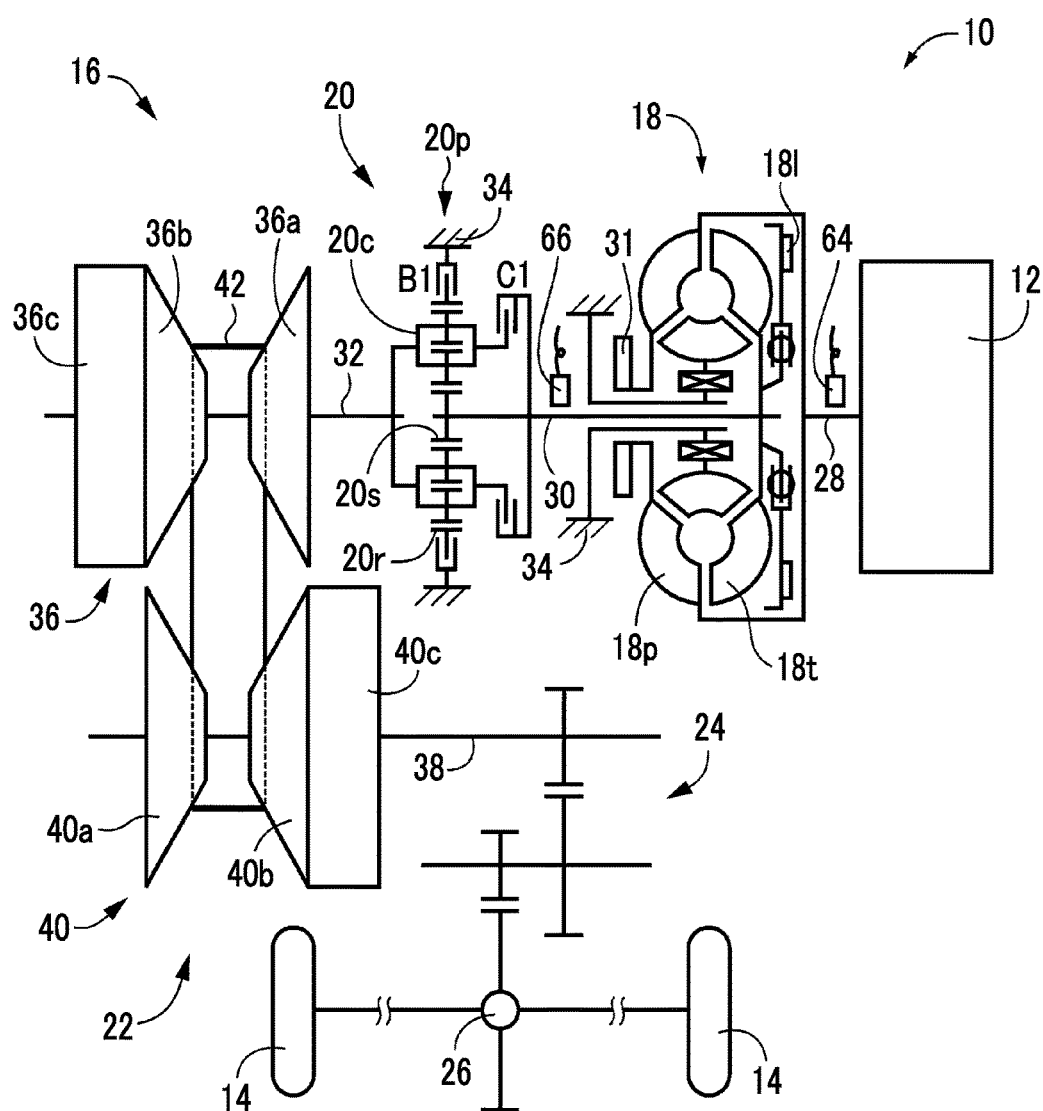
FIG. 1 is a view that illustrates the schematic configuration of a power transmission path from an engine to drive wheels, which constitute a vehicle to which the disclosure is suitably applied.

FIG. 1 is a view that shows a vehicle 10 to which the disclosure is suitably applied. The vehicle 10 includes an engine 12, drive wheels 14 and a power transmission device 16 for a vehicle (hereinafter, referred to as power transmission device 16). The power transmission device 16 is provided in the power transmission path between the engine 12 and the drive wheels 14. The power transmission device 16 includes a torque converter (fluid coupling) 18, a forward/reverse switching device 20, a belt-type continuously variable transmission 22, a reduction gear device 24, a differential gear unit 26, and the like. The torque converter 18 is a fluid transmission device. In the power transmission device 16, power generated by the engine 12 is transmitted to the pair of right and left drive wheels 14 sequentially via the torque converter 18, the forward/reverse switching device 20, the belt-type continuously variable transmission 22, the reduction gear device 24, the differential gear unit 26, and the like. The engine 12 is a driving force source for propelling the vehicle 10.

The torque converter 18 includes a pump impeller 18$p$ and a turbine runner 18$t$, and is configured to transmit power via fluid. The pump impeller 18$p$ corresponds to an input member coupled to a crankshaft 28 of the engine 12. The turbine runner 18$t$ corresponds to an output member coupled to the forward/reverse switching device 20 via a turbine shaft 30. A lockup clutch 18$l$ is provided between those pump impeller 18$p$ and turbine runner 18$t$. When the lockup clutch 18$l$ is completely engaged, the pump impeller 18$p$ and the turbine runner 18$t$ are integrally rotated. That is, in the torque converter 18, the pump impeller 18$p$ and the turbine runner 18$t$ are directly coupled to each other when the lockup clutch 18$l$ is engaged. A mechanical oil pump 31 is coupled to the pump impeller 18$p$. The mechanical oil pump 31 generates hydraulic pressure when the mechanical oil pump 31 is rotationally driven by the engine 12. The hydraulic pressure is used to execute shift control over the belt-type continuously variable transmission 22, generate belt clamping force in the belt-type continuously variable transmission 22, control a differential pressure (engaging pressure) $\Delta P$ of the lockup clutch 18$l$, change the power transmission path in the forward/reverse switching device 20 or supply lubricating oil to various portions in the power transmission path of the vehicle 10.

As is well known, the lockup clutch 18$l$ is a hydraulic friction clutch. The lockup clutch 18$l$ is frictionally engaged with a front cover 18$c$ on the basis of the differential pressure $\Delta P$ (=Pon−Poff) between a hydraulic pressure Pon inside an engaging-side oil chamber 18on and a hydraulic pressure Poff inside a releasing-side oil chamber 18off. The differential pressure $\Delta P$ is controlled by a hydraulic control circuit 100 (see FIG. 2) (described later). The operation status of the torque converter 18 is roughly classified into three states, that is, for example, a so-called lockup released state (torque converter state or lockup off state), a so-called flex lockup state (half-engaged state or slipping state) and a so-called complete lockup state (completely engaged state or lockup on state). In the lockup released state, the lockup clutch 18$l$ is released by setting the differential pressure $\Delta P$ to a negative value. In the flex lockup state, the lockup clutch 18$l$ is half-engaged and slipping by setting the differential pressure $\Delta P$ to zero or higher. In the complete lockup state, the lockup clutch 18$l$ is completely engaged by setting the differential pressure $\Delta P$ to a maximum value.

In the complete lockup state, the lockup clutch 18$l$ is completely engaged. As a result, the pump impeller 18$p$ and the turbine runner 18$t$ are integrally rotated, and the power of the engine 12 is directly transmitted to the belt-type continuously variable transmission 22 side. In the flex lockup state, the differential pressure $\Delta P$ is controlled such that the lockup clutch 18$l$ is engaged in a predetermined slipping state, for example, when a slip amount (rotational difference) $\Delta N$ (rpm) is controlled in a feedback manner. As a result, the turbine shaft 30 is rotated to follow the crankshaft 28 with the predetermined slip amount $\Delta N$ when the vehicle 10 is driven (in a power on state), while the crankshaft 28 is rotated to follow the turbine shaft 30 with the predetermined slip amount ΔN when the vehicle 10 is not driven (in a power off state). The slip amount ΔN is expressed by the difference between the rotation speed of the engine 12 (pump impeller 18p) and the rotation speed of the turbine runner 18t (Engine rotation speed Ne−Turbine rotation speed Nt).

The forward/reverse switching device 20 includes a forward clutch C1, a reverse brake B1 and a double pinion planetary gear train 20p. The double pinion planetary gear train 20p includes a sun gear 20s, a carrier 20c and a ring gear 20r. The turbine shaft 30 of the torque converter 18 is integrally coupled to the sun gear 20s. An input shaft 32 of the belt-type continuously variable transmission 22 is integrally coupled to the carrier 20c. The carrier 20c and the sun gear 20s are selectively coupled to each other via the forward clutch C1. The ring gear 20r is selectively fixed to a housing 34 via the reverse brake B1. The housing 34 serves as a non-rotating member. The forward clutch C1 and the reverse brake B1 each are suitably a hydraulic friction engaging device that is frictionally engaged by a hydraulic cylinder.

In the thus configured forward/reverse switching device 20, when the forward clutch C1 is engaged and the reverse brake B1 is released, the forward/reverse switching device 20 is placed in an integral rotation state. As a result, the turbine shaft 30 is directly coupled to the input shaft 32. Therefore, a forward power transmission path is established, and driving force in the forward traveling direction is transmitted to the belt-type continuously variable transmission 22 side. When the reverse brake B1 is engaged and the forward clutch C1 is released, a reverse power transmission path is established in the forward/reverse switching device 20. As a result, the input shaft 32 is rotated in the reverse direction with respect to the turbine shaft 30, and driving force in the reverse traveling direction is transmitted to the belt-type continuously variable transmission 22 side. When both the forward clutch C1 and the reverse brake B1 are released, the forward/reverse switching device 20 is placed in a neutral state in which power transmission is interrupted (power transmission interrupted state).

The belt-type continuously variable transmission 22 includes a primary pulley (primary sheave) 36, a secondary pulley (secondary sheave) 40 (hereinafter, unless specifically distinguished, simply referred to as variable pulleys 36, 40), and a transmission belt 42. The primary pulley 36 is an input-side member provided on the input shaft 32, and is an input-side variable pulley having a variable effective diameter. The secondary pulley 40 is an output-side member provided on an output shaft 38, and is an output-side variable pulley having a variable effective diameter. The transmission belt 42 is wound to span between the pair of variable pulleys 36, 40. With the above configuration, in the belt-type continuously variable transmission 22, power is transmitted via friction force between the transmission belt 42 and each of the pair of variable pulleys 36, 40. The transmission belt 42 has, for example, an endless annular shape as a whole. The transmission belt 42 includes a pair of endless annular tape-shaped hoops (belts) and a large number of elements (bridges). The elements are stacked in the thickness direction so as to be in close contact with each other along the pair of hoops. Each element has a pair of hoop engaging grooves formed so as to open laterally. The pair of hoops are engaged with those hoop engaging grooves.

The primary pulley 36 includes a fixed rotor 36a, a movable rotor 36b and a primary hydraulic cylinder 36c. The fixed rotor 36a serves as an input-side fixed rotor fixed to the input shaft 32. The movable rotor 36b serves as an input-side movable rotor provided so as to be relatively non-rotatable around the axis and movable in the axial direction with respect to the input shaft 32. The primary hydraulic cylinder 36c serves as a hydraulic actuator that applies input-side thrust (primary thrust) Win (=Primary pressure $P_{PS}$×Pressure receiving area) in the primary pulley 36 for changing the V-groove width between the fixed rotor 36a and the movable rotor 36b. The secondary pulley 40 includes a fixed rotor 40a, a movable rotor 40b and a secondary hydraulic cylinder 40c. The fixed rotor 40a serves as an output-side fixed rotor fixed to the output shaft 38. The movable rotor 40b serves as an output-side movable rotor provided so as to be relatively non-rotatable around the axis and movable in the axial direction with respect to the output shaft 38. The secondary hydraulic cylinder 40c serves as a hydraulic actuator that applies output-side thrust (secondary thrust) Wout (=Secondary pressure $P_{SS}$×Pressure receiving area)) in the secondary pulley 40 for changing the V-groove width between the fixed rotor 40a and the movable rotor 40b.

Figure 2:
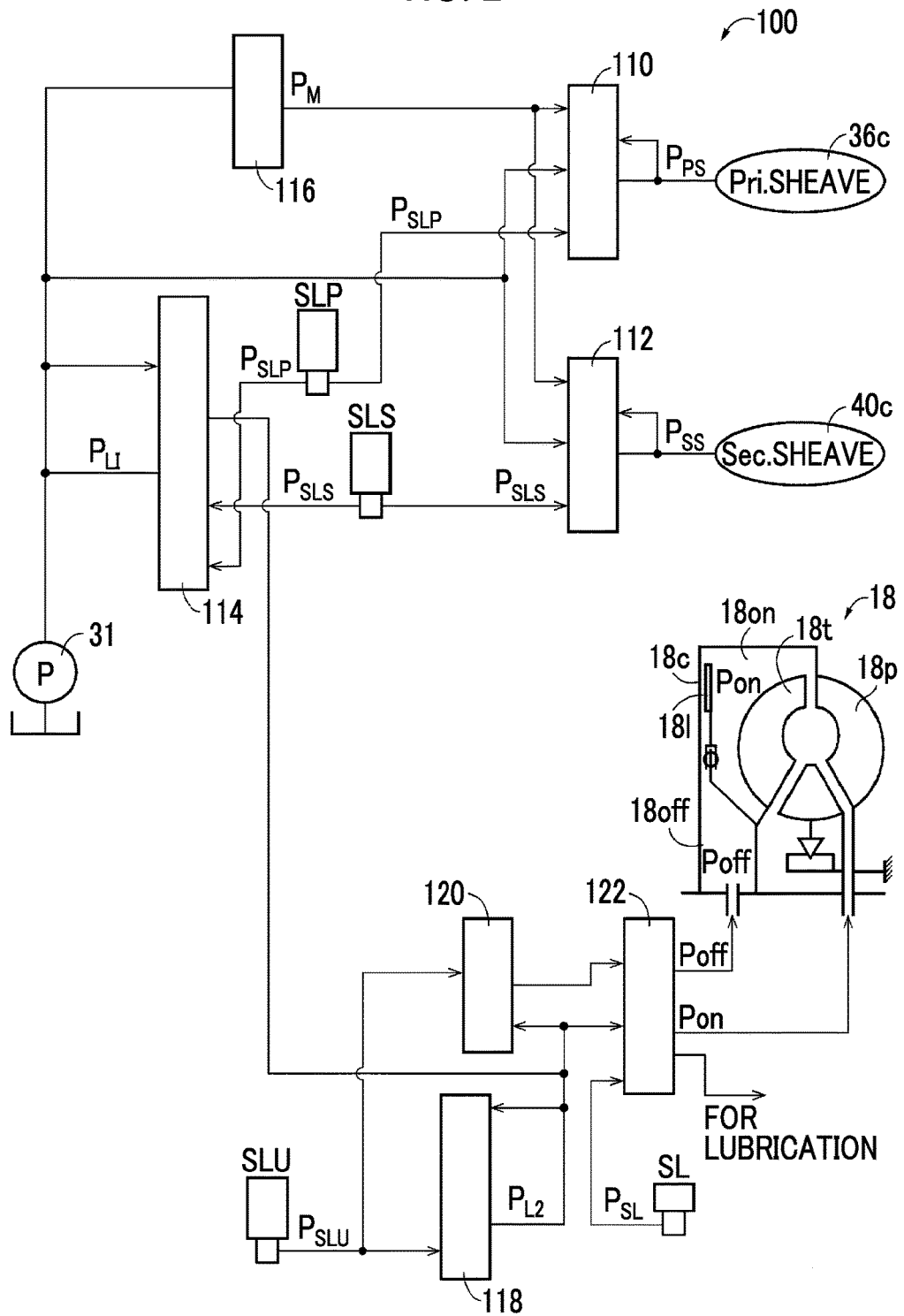
FIG. 2 is a hydraulic control circuit that shows a relevant portion associated with engagement control over a lockup clutch, belt clamping force control and speed ratio control over a continuously variable transmission, and the like, in a hydraulic control circuit provided in the vehicle shown in FIG. 1.

As shown in FIG. 2, the primary pressure $P_{PS}$ that is supplied to the oil chamber of the primary hydraulic cylinder 36c and the secondary pressure $P_{SS}$ that is supplied to the oil chamber of the secondary hydraulic cylinder 40c each are independently regulated by the hydraulic control circuit 100 provided in the vehicle 10. Thus, the input-side thrust Win in the primary pulley 36 and the output-side thrust Wout in the secondary pulley 40 each are directly or indirectly controlled. As a result, the V-groove width of each of the pair of variable pulleys 36, 40 changes, and the winding diameter (effective diameter) of the transmission belt 42 is changed, with the result that a speed ratio (gear ratio) γ (=Input shaft rotation speed Nin/Output shaft rotation speed Nout) of the belt-type continuously variable transmission 22 is continuously varied. At the same time, friction force (belt clamping force) between the transmission belt 42 and each of the pair of variable pulleys 36, 40 is controlled such that the transmission belt 42 does not slip.

As shown in FIG. 2, the hydraulic control circuit 100 includes the oil pump 31, a primary pressure control valve 110, a secondary pressure control valve 112, a primary regulator valve 114, a modulator valve 116, a secondary regulator valve 118, a lockup control valve 120, a lockup relay valve 122, a linear solenoid valve SLP, a linear solenoid valve SLS, a linear solenoid valve SLU, a solenoid valve SL, and the like. The primary pressure control valve 110 regulates the primary pressure $P_{PS}$. The secondary pressure control valve 112 regulates the secondary pressure $P_{SS}$. The primary regulator valve 114 regulates a first line pressure $P_{L1}$. The modulator valve 116 regulates a modulator pressure $P_M$. The secondary regulator valve 118 regulates a second line pressure $P_{L2}$. The lockup control valve 120 and the lockup relay valve 122 regulate the differential pressure ΔP of the lockup clutch 18l. The linear solenoid valve SLP regulates a control hydraulic pressure $P_{SLP}$. The linear solenoid valve SLS regulates a control hydraulic pressure $P_{SLS}$. The linear solenoid valve SLU regulates a control hydraulic pressure $P_{SLU}$. The solenoid valve SL regulates a switching signal pressure $P_{SL}$. Each of the linear solenoid valves SLP, SLS, SLU is an electromagnetic control valve that regulates a control hydraulic pressure on the basis of a command value that is supplied from an electronic control unit (control system) 50 (described later). The solenoid valve SL is an electromagnetic valve (on-off valve) that switches between output (on state) and non-output (off state)

of the switching signal pressure $P_{SL}$ on the basis of a command value that is supplied from the electronic control unit 50.

The first line pressure $P_{L1}$ is, for example, regulated by the relieving primary regulator valve 114 on the basis of the control hydraulic pressure $P_{SLP}$, the control hydraulic pressure $P_{SLS}$, the second line pressure $P_{L2}$, and the like, by using working hydraulic pressure that is output from the oil pump 31 as a source pressure. The control hydraulic pressure $P_{SLP}$ is the output hydraulic pressure of the linear solenoid valve SLP. The control hydraulic pressure $P_{SLS}$ is the output hydraulic pressure of the linear solenoid valve SLS. The second line pressure $P_{L2}$ is the output hydraulic pressure of the secondary regulator valve 118. Suitably, the first line pressure $P_{L1}$ is regulated to a value commensurate with an engine load, input torque $T_{IN}$ to the belt-type continuously variable transmission 22, and the like. For example, the first line pressure $P_{L1}$ is regulated to a hydraulic pressure obtained by adding a predetermined margin to a higher one of the primary pressure $P_{PS}$ and the secondary pressure $P_{SS}$. Therefore, insufficient supply of the first line pressure $P_{L1}$ that is the source pressure in the regulating operations of the primary pressure control valve 110 and secondary pressure control valve 112 is avoided, and the first line pressure $P_{L1}$ is not unnecessarily increased.

The modulator pressure $P_M$ is the source pressure of each of the control hydraulic pressure $P_{SLP}$, the control hydraulic pressure $P_{SLS}$, the control hydraulic pressure $P_{SLU}$, and the like. The control hydraulic pressure $P_{SLP}$ is the output hydraulic pressure of the linear solenoid valve SLP. The control hydraulic pressure $P_{SLS}$ is the output hydraulic pressure of the linear solenoid valve SLS. The control hydraulic pressure $P_{SLU}$ is the output hydraulic pressure of the linear solenoid valve SLU. The modulator pressure $P_M$ is, for example, regulated to a predetermined hydraulic pressure (constant pressure) by the modulator valve 116 by using the first line pressure $P_{L1}$ as a source pressure. The first line pressure $P_{L1}$ is the output hydraulic pressure of the primary regulator valve 114. The second line pressure $P_{L2}$ is, for example, regulated by the relieving secondary regulator valve 118 on the basis of the control hydraulic pressure $P_{SLU}$, and the like, by using the first line pressure $P_{L1}$ as a source pressure. The control hydraulic pressure $P_{SLU}$ is the output hydraulic pressure of the linear solenoid valve SLU. The first line pressure $P_{L1}$ is the output hydraulic pressure of the primary regulator valve 114. As described above, the first line pressure $P_{L1}$ is regulated on the basis of the control hydraulic pressure $P_{SLP}$, the control hydraulic pressure $P_{SLS}$, the second line pressure $P_{L2}$, and the like. The control hydraulic pressure $P_{SLP}$ is the output hydraulic pressure of the linear solenoid valve SLP. The control hydraulic pressure $P_{SLS}$ is the output hydraulic pressure of the linear solenoid valve SLS. The second line pressure PLS is the output hydraulic pressure of the secondary regulator valve 118. Therefore, the line pressure in the hydraulic control circuit 100 is regulated on the basis of the control hydraulic pressure $P_{SLP}$, the control hydraulic pressure $P_{SLS}$ and the control hydraulic pressure $P_{SLU}$. The control hydraulic pressure $P_{SLP}$ is the output hydraulic pressure of the linear solenoid valve SLP. The control hydraulic pressure $P_{SLS}$ is the output hydraulic pressure of the linear solenoid valve SLS. The control hydraulic pressure $P_{SLU}$ is the output hydraulic pressure of the linear solenoid valve SLU.

The primary pressure control valve 110, for example, regulates the first line pressure $P_{L1}$ by using the control hydraulic pressure $P_{SLP}$ as a pilot pressure, and supplies the regulated first line pressure $P_{L1}$ to the primary hydraulic cylinder 36c of the primary pulley 36. The control hydraulic pressure $P_{SLP}$ is the output hydraulic pressure of the linear solenoid valve SLP. Thus, the primary pressure $P_{PS}$ that is supplied to the primary hydraulic cylinder 36c is controlled. For example, when the control hydraulic pressure $P_{SLP}$ that is output from the linear solenoid valve SLP is increased from the state where a predetermined hydraulic pressure is supplied to the primary hydraulic cylinder 36c, the primary pressure $P_{PS}$ that is supplied to the primary hydraulic cylinder 36c is increased accordingly. On the other hand, when the control hydraulic pressure $P_{SLP}$ that is output from the linear solenoid valve SLP is decreased from the state where the predetermined hydraulic pressure is supplied to the primary hydraulic cylinder 36c, the primary pressure $P_{PS}$ that is supplied to the primary hydraulic cylinder 36c is decreased accordingly.

The secondary pressure control valve 112, for example, regulates the first line pressure $P_{L1}$ by using the control hydraulic pressure $P_{SLS}$ as a pilot pressure, and supplies the regulated first line pressure $P_{L1}$ to the secondary hydraulic cylinder 40c of the secondary pulley 40. The control hydraulic pressure $P_{SLS}$ is the output hydraulic pressure of the linear solenoid valve SLS. Thus, the secondary pressure $P_{SS}$ that is supplied to the secondary hydraulic cylinder 40c is controlled. For example, when the control hydraulic pressure $P_{SLS}$ that is output from the linear solenoid valve SLS is increased from the state where a predetermined hydraulic pressure is supplied to the secondary hydraulic cylinder 40c, the secondary pressure $P_{SS}$ that is supplied to the secondary hydraulic cylinder 40c is increased accordingly. On the other hand, when the control hydraulic pressure $P_{SLS}$ that is output from the linear solenoid valve SLS is decreased from the state where the predetermined hydraulic pressure is supplied to the secondary hydraulic cylinder 40c, the secondary pressure $P_{SS}$ that is supplied to the secondary hydraulic cylinder 40c is decreased accordingly.

In the thus configured hydraulic control circuit 100, the secondary pressure $P_{SS}$ is controlled such that no slip occurs between the transmission belt 42 and each of the variable pulleys 36, 40 and belt clamping force that does not unnecessarily increase is provided to the pair of variable pulleys 36, 40. For example, in the correlation between the primary pressure $P_{PS}$ and the secondary pressure $P_{SS}$, when the thrust ratio τ (=Wout/Win) of the pair of variable pulleys 36, 40 is changed, the speed ratio γ of the belt-type continuously variable transmission 22 is changed. For example, as the thrust ratio τ is increased, the speed ratio γ is increased (that is, the belt-type continuously variable transmission 22 is downshifted).

The lockup relay valve 122 switches the lockup clutch 18l between the released state and the engaged state or slipping state. That is, the lockup relay valve 122 is switched to a releasing position (off position) and an engaging position (on position) in response to the switching signal pressure $P_{SL}$ from the solenoid valve SL. At the releasing position, the lockup clutch 18l is placed in the released state. At the engaging position, the lockup clutch 18l is placed in the engaged state or the slipping state. When the switching signal pressure $P_{SL}$ from the solenoid valve SL is in an on state (the switching signal pressure $P_{SL}$ is supplied), the lockup relay valve 122 is switched to the on position. When the switching signal pressure $P_{SL}$ is in an off state (the switching signal pressure $P_{SL}$ is not supplied), the lockup relay valve 122 is switched to the off position. When the lockup clutch 18l is placed in the engaged state or the slipping state by the lockup relay valve 122, the lockup control valve 120 controls the slip amount ΔN of the lockup clutch 18l or completely engages the lockup clutch 18l in response to the control hydraulic pressure $P_{SLU}$ that is output from the linear solenoid valve SLU. That is, the lockup control valve 120 switches the operation status of the lockup clutch 18l within the range of the slipping state to the lockup on state in response to the control hydraulic pressure $P_{SLU}$.

The linear solenoid valve SLU functions as a slip control linear solenoid valve during slip control (during half-engagement control) over the lockup clutch 18l. The linear solenoid valve SLU outputs the control hydraulic pressure $P_{SLU}$ in accordance with a command signal, that is, a lockup command pressure Slu1 (described later), that is output from the electronic control unit 50. The control hydraulic pressure $P_{SLU}$ is used to control the differential pressure ΔP at the time when the lockup clutch 18l is engaged or engaged in a slipping state. For example, the linear solenoid valve SLU is an electromagnetic control valve that uses the modulator pressure $P_M$ as a source pressure, and outputs the control hydraulic pressure $P_{SLU}$ by reducing the modulator pressure $P_M$. The modulator pressure $P_M$ is output from the modulator valve 116. The linear solenoid valve SLU generates the control hydraulic pressure $P_{SLU}$ in response to a command signal that is output from the electronic control unit 50.

The solenoid valve SL outputs a predetermined switching signal pressure $P_{SL}$ in accordance with an on-off signal, that is, a switching command pressure Slu2 (described later), that is output from the electronic control unit 50. For example, the switching signal pressure $P_{SL}$ is set to a drain pressure when the solenoid valve SL is placed in a non-energized state (off state). On the other hand, the switching signal pressure $P_{SL}$ is applied to the oil chamber of the lockup relay valve 122 as the modulator pressure $P_M$ when the solenoid valve SL is placed in an energized state (on state). Thus, the lockup relay valve 122 is set to the on position (ON) that is the engaged state.

With the thus configured hydraulic control circuit 100, when the status of supply of working hydraulic pressure that is supplied to the engaging-side oil chamber 18on and the releasing-side oil chamber 18off in the torque converter 18 from the lockup relay valve 122, the operation status of the lockup clutch 18l is switched. Initially, the case where the lockup clutch 18l is placed in the slipping state or the lockup on state will be described. When the switching signal pressure $P_{SL}$ is supplied to the lockup relay valve 122 by the solenoid valve SL, the lockup relay valve 122 is set to the on position, and the second line pressure $P_{L2}$ supplied to the lockup relay valve 122 is supplied to the engaging-side oil chamber 18on of the torque converter 18. The second line pressure $P_{L2}$ that is supplied to the engaging-side oil chamber 18on is the hydraulic pressure Pon. At the same time, the releasing-side oil chamber 18off is communicated with a predetermined port in the lockup control valve 120. Then, the hydraulic pressure Poff in the releasing-side oil chamber 18off is adjusted by the lockup control valve 120 (the differential pressure ΔP (=Pon−Poff), that is, the engaging pressure, is adjusted by the lockup control valve 120), and the operation status of the lockup clutch 18l is switched within the range of the slipping state to the lockup on state. The flow rate of hydraulic oil that is supplied from the lockup control valve 120 to the releasing-side oil chamber 18off is controlled by the control hydraulic pressure $P_{SLU}$ that is supplied to the lockup control valve 120. That is, the differential pressure ΔP is controlled by the control hydraulic pressure $P_{SLU}$ of the linear solenoid valve SLU, with the result that the slipping state (engaging force) of the lockup clutch 18l is controlled.

When the control hydraulic pressure $P_{SLU}$ for setting the lockup control valve 120 to a completely engaged (on) position is supplied to the lockup control valve 120 while the switching signal pressure $P_{SL}$ is supplied to the lockup relay valve 122 by the solenoid valve SL, the second line pressure $P_{L2}$ is not supplied from the lockup control valve 120 to the releasing-side oil chamber 18off, and hydraulic oil from the releasing-side oil chamber 18off is drained via a drain port. Thus, the differential pressure ΔP is set to the maximum value, and the lockup clutch 18l is set to the completely engaged state. When the lockup clutch 18l is in the slipping state or the completely engaged state, the lockup relay valve 122 is placed at the on position, and hydraulic oil flowing out from the secondary regulator valve 118 is supplied via the drain port in order to, for example, lubricate the device.

On the other hand, when the switching signal pressure $P_{SL}$ from the solenoid valve SL is not supplied to the lockup relay valve 122, the lockup relay valve 122 is set to the off position, and the second line pressure $P_{L2}$ supplied to the lockup relay valve 122 is supplied to the releasing-side oil chamber 18off. Hydraulic oil drained via the engaging-side oil chamber 18on is supplied in order to, for example, lubricate the device. That is, when the switching signal pressure $P_{SL}$ is not supplied from the solenoid valve SL to the lockup relay valve 122, the lockup clutch 18l is set to the released state, and slip control or engagement control by way of the linear solenoid valve SLU and the lockup control valve 120 is not executed. In other words, even when the signal pressure $P_{SLU}$ that is output from the linear solenoid valve SLU is changed, but the change is not reflected by the engaged state (differential pressure ΔP) of the lockup clutch 18l as long as the lockup relay valve 122 is placed at the off position.

Figure 3:
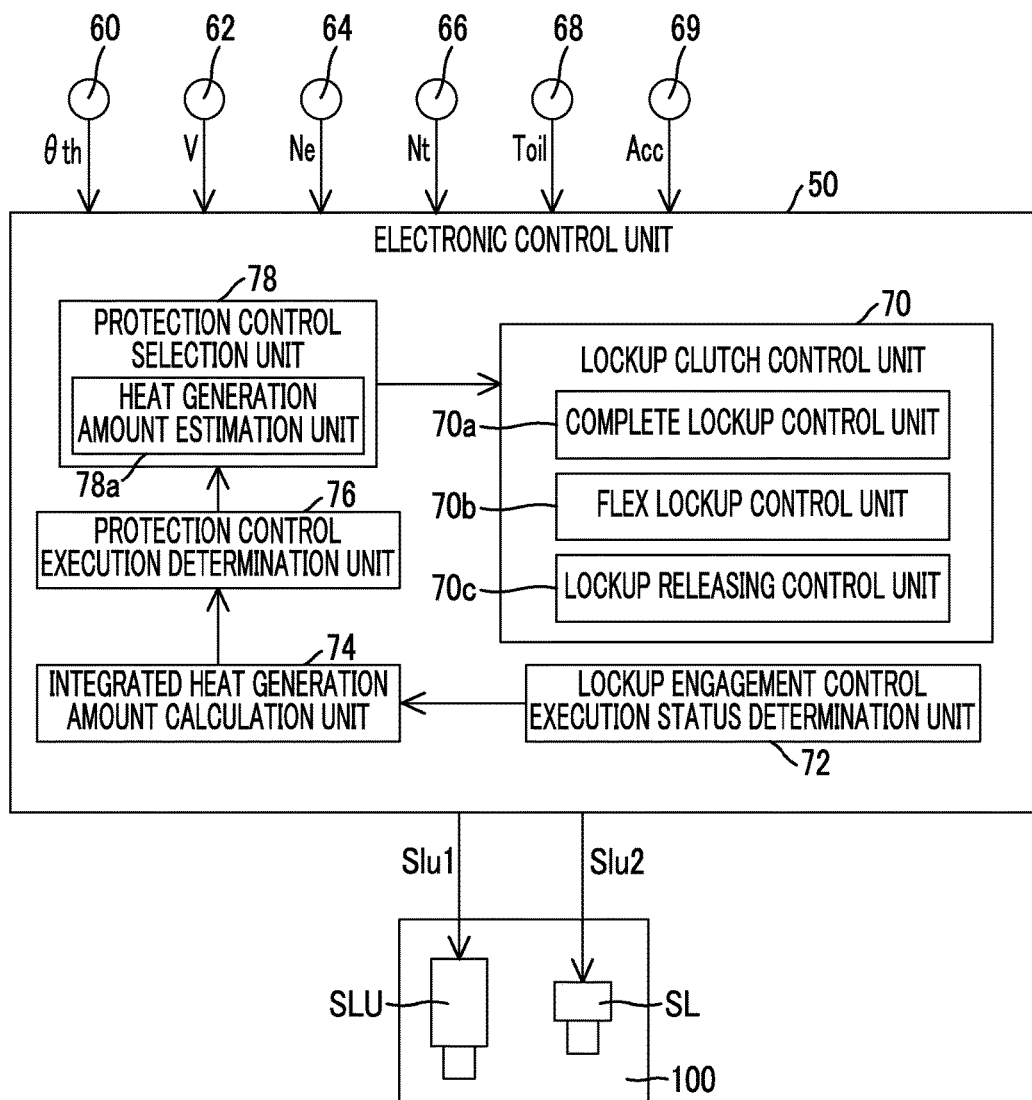
FIG. 3 is a view that shows the input/output system of an electronic control unit provided in the vehicle shown in FIG. 1, and shows functional blocks that illustrate a relevant portion of control functions implemented by the electronic control unit.

The vehicle 10 (see FIG. 1) includes the electronic control unit 50 (see FIG. 3). The electronic control unit 50, for example, executes lockup engagement control, and the like, by way of the hydraulic control circuit 100. The differential pressure (engaging pressure) ΔP of the lockup clutch 18l is controlled through the lockup engagement control. FIG. 3 is a view that shows the input/output system of the electronic control unit 50, and shows functional blocks that illustrate a relevant portion of control functions implemented by the electronic control unit 50. The electronic control unit 50 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM.

Various input signals that are detected by various sensors provided in the vehicle 10 are supplied to the electronic control unit 50. For example, a signal indicating a throttle valve opening degree θth (%), a signal indicating a vehicle speed V (km/h), a signal indicating an engine rotation speed Ne (rpm) of the engine 12, a signal indicating a turbine rotation speed Nt (rpm) of the turbine runner 18t of the torque converter 18, a signal indicating an actual oil temperature Toil(° C.) of hydraulic oil that is supplied into, for example, the engaging-side oil chamber 18on of the torque converter 18, a signal indicating an operation amount Acc (%) of an accelerator pedal, and the like, are input to the electronic control unit 50. The throttle valve opening degree θth (%) is detected by a throttle valve opening degree sensor 60. The vehicle speed V (km/h) is detected by a vehicle speed sensor 62. The engine rotation speed Ne (rpm) of the engine 12 is detected by an engine rotation sensor 64. The turbine rotation speed Nt (rpm) of the turbine runner 18t of the torque converter 18 is detected by a turbine rotation sensor 66. The actual oil temperature Toil(° C.) of hydraulic oil is detected by an oil temperature sensor 68. The operation amount Acc (%) of the accelerator pedal is detected by an accelerator operation amount sensor 69. A lockup command pressure Slu1, a switching command pressure Slu2, and the like, for switching control over the operation status of the lockup clutch 18*l* are output from the electronic control unit 50. The lockup command pressure Slu1 is a command signal for driving the linear solenoid valve SLU that regulates the control hydraulic pressure $P_{SLU}$, and is output to the linear solenoid valve SLU of the hydraulic control circuit 100. The switching command pressure Slu2 is a command signal for driving the solenoid valve SL that sets the switching signal pressure $P_{SL}$ to the on state or the off state, and is output to the solenoid valve SL of the hydraulic control circuit 100.

The electronic control unit 50 shown in FIG. 3 includes a lockup clutch control unit 70, a lockup engagement control execution status determination unit 72, an integrated heat generation amount calculation unit 74, a protection control execution determination unit 76, a protection control selection unit (selection unit) 78, and the like, as a relevant portion of control functions. The lockup clutch control unit 70 shown in FIG. 3 includes a complete lockup control unit 70*a*, a flex lockup control unit 70*b*, a lockup releasing control unit 70*c*, and the like.

The lockup clutch control unit 70 shown in FIG. 3 determines any one of a lockup off region, a slipping operation region and a lockup on region as an operation region on the basis of an actual vehicle speed V and an actual throttle valve opening degree θth by consulting a predetermined relationship (lockup region map) including the lockup off region, the slipping operation region and the lockup on region by using a vehicle speed V and a throttle valve opening degree θth as variables. The lockup clutch control unit 70 controls the lockup command pressure Slu1 and the switching command pressure Slu2 that are command signals such that the operation status of the lockup clutch 18*l* becomes an operation status corresponding to the determined region. The linear solenoid valve SLU and the solenoid valve SL, provided in the hydraulic control circuit 100, are driven (operated) in accordance with these lockup command pressure Slu1 and switching command pressure Slu2 such that the operation status of the lockup clutch 18*l* becomes the operation status corresponding to the determined region.

When the lockup clutch control unit 70 determines the lockup on region in the lockup region map as the operation region, the complete lockup control unit 70*a* executes complete lockup control. In the complete lockup control, the switching command pressure Slu2 is output to the solenoid valve SL such that the switching signal pressure $P_{SL}$ is supplied from the solenoid valve SL to the lockup relay valve 122, and the lockup command pressure Slu1 for the lockup engaging pressure $P_{SLU}$ of the lockup clutch 18*l* is controlled such that the lockup clutch 18*l* is completely engaged.

When the lockup clutch control unit 70 determines the slipping operation region in the lockup region map as the operation region, the flex lockup control unit 70*b* executes flex lockup control, that is, lockup engagement control (engagement control) for controlling the differential pressure (Pon–Poff) ΔP of the lockup clutch 18*l*, that is, the lockup command pressure Slu1 for the control hydraulic pressure $P_{SLU}$, such that the lockup clutch 18*l* is half-engaged. The flex lockup control is feedback control in which, the switching command pressure Slu2 is output to the solenoid valve SL such that the switching signal pressure $P_{SL}$ is supplied from the solenoid valve SL to the lockup relay valve 122, and the lockup command pressure Slu1 for the control hydraulic pressure $P_{SLU}$ of the lockup clutch 18*l* is adjusted such that an actual slip amount ΔN (rpm) of the lockup clutch 18*l* coincides with a preset target slip amount ΔN* (rpm) between the pump impeller 18*p* and turbine runner 18*t* of the torque converter 18 without completely engaging the lockup clutch 18*l*.

When the lockup clutch control unit 70 determines the lockup off region in the lockup region map as the operation region, the lockup releasing control unit 70*c* executes lockup releasing control. In the lockup releasing control, in order to release the lockup clutch 18*l*, that is, for example, in order not to supply the switching signal pressure $P_{SL}$ from the solenoid valve SL to the lockup relay valve 122, the switching command pressure Slu2 is not output to the solenoid valve SL, and the lockup command pressure Slu1 for the control hydraulic pressure $P_{SLU}$ of the lockup clutch 18*l* is not adjusted.

The lockup engagement control execution status determination unit 72 determines whether the lockup engagement control is being executed. In the lockup engagement control, the differential pressure ΔP of the lockup clutch 18*l* is controlled by the lockup clutch control unit 70, that is, the flex lockup control unit 70*b*, such that the lockup clutch 18*l* is half-engaged. For example, the lockup engagement control execution status determination unit 72 determines that the lockup engagement control is being executed when the lockup clutch control unit 70 determines that an actual vehicle speed V and an actual throttle valve opening degree θth fall within the slipping operation region in the lockup region map.

When the lockup engagement control execution status determination unit 72 determines that the lockup engagement control is being executed, the integrated heat generation amount calculation unit 74 calculates an integrated amount Qi(J) of heat that is generated in the lockup clutch 18*l* during execution of the lockup engagement control by using the following mathematical expressions (1) to (4) at each sampling time.

$$Qi = Qi_{n-1} + Q_{LC} - k \cdot \Delta T \quad (1)$$

$$Q_{LC} = T_{LC} \cdot (\pi/30) \cdot \Delta N \cdot dt \quad (2)$$

$$Te = T_{LC} + T_{TC} \quad (3)$$

$$T_{TC} = \tau \cdot (Ne/1000)^2 \quad (4)$$

where $Qi_{n-1}$ in the mathematical expression (1) is the last integrated amount Qi(J) of heat generated in the lockup clutch 18*l* before a lapse of the sampling time. In the mathematical expression (1), $Q_{LC}$ is the amount of heat generated in the lockup clutch 18*l* through the lockup engagement control during the sampling time. In the mathematical expression, k is a cooling rate correction coefficient (J/(° C.·sec)) depending on hydraulic oil inside the torque converter 18. In the mathematical expression (1), ΔT is a temperature difference (° C.) between the surface temperature of the friction material of the lockup clutch 18*l* and the oil temperature Toil, and the surface temperature of the friction material of the lockup clutch 18*l* is obtained by dividing $Qi_{n-1}$ by the heat capacity (J/° C.) of the friction material of the lockup clutch 18. In the mathematical expressions (2) and (3), $T_{LC}$ is a lockup clutch transmission torque. In the mathematical expression (3), Te is an output torque of the engine 12, and is obtained on the basis of an actual operation amount Acc of the accelerator pedal and an actual engine rotation speed Ne by consulting a relational map of the engine torque Te, obtained in advance and composed of the operation amount Acc of the accelerator pedal and the engine rotation speed Ne. In the mathematical expressions (3) and (4), $T_{TC}$ is a fluid transmission torque of the torque converter 18. In the mathematical expression (4), τ is a capacity coefficient of the torque converter 18.

When the lockup engagement control execution status determination unit 72 determines that the lockup engagement control is being executed and the integrated heat generation amount calculation unit 74 calculates the integrated amount Qi of heat that is generated in the lockup clutch 18l during the lockup engagement control, the protection control execution determination unit 76 determines whether it is required to execute any one of completely engaging protection control (first control) and releasing protection control (second control) in order to protect the lockup clutch 18l against the generated heat. The completely engaging protection control is control for completely engaging the lockup clutch 18l from the state of the lockup engagement control. The releasing protection control is control for releasing the lockup clutch 18l from the state of the lockup engagement control. For example, when the integrated amount Qi of heat generated, calculated by the integrated heat generation amount calculation unit 74, becomes larger than or equal to a predetermined heat generation amount determination value A, the protection control execution determination unit 76 determines that it is required to execute any one of the completely engaging protection control and the releasing protection control. The heat generation amount determination value A (J) is the amount of heat to such an extent that the lockup clutch 18l needs protection against the generated heat, that is, the amount of heat at or above which it is highly likely that heat in the lockup clutch 18l has an influence, such as a decrease in durability, on the lockup clutch 18l.

When the protection control execution determination unit 76 determines that it is required to execute any one of the completely engaging protection control and the releasing protection control, the protection control selection unit 78 selects one of a completely engaging heat generation amount Qb (J) and a releasing heat generation amount Qa (J), by which the amount of heat that is generated in the lockup clutch 18l is reduced. The completely engaging heat generation amount Qb (J) is generated in the lockup clutch 18l in the period from when the protection control execution determination unit 76 determines that it is required to execute any one of the completely engaging protection control and the releasing protection control after the start of the lockup engagement control (the integrated amount Qi of heat, calculated by the integrated heat generation amount calculation unit 74, becomes larger than or equal to the predetermined heat generation amount determination value A after the start of the lockup engagement control) to when the lockup clutch 18l is completely engaged. The releasing heat generation amount Qa (J) is generated in the lockup clutch 18l in the period from when the protection control execution determination unit 76 determines that it is required to execute any one of the completely engaging protection control and the releasing protection control after the start of the lockup engagement control to when the lockup clutch 18l is released. When the protection control selection unit 78 selects the completely engaging protection control, the complete lockup control unit 70a executes complete lockup control. When the protection control selection unit 78 selects the releasing protection control, the lockup releasing control unit 70c executes lockup releasing control.

The protection control selection unit 78 includes a heat generation amount estimation unit 78a. When the protection control execution determination unit 76 determines that it is required to execute any one of the completely engaging protection control and the releasing protection control, the heat generation amount estimation unit 78a estimates the completely engaging heat generation amount Qb (J) and the releasing heat generation amount Qa (J) by using, for example, maps shown in FIG. 4 to FIG. 7 and the following mathematical expressions (5), (6).

$$Qa = Qa1 + Qa2 \quad (5)$$

$$Qb = Qb1 + Qb2 \quad (6)$$

Figure 4:
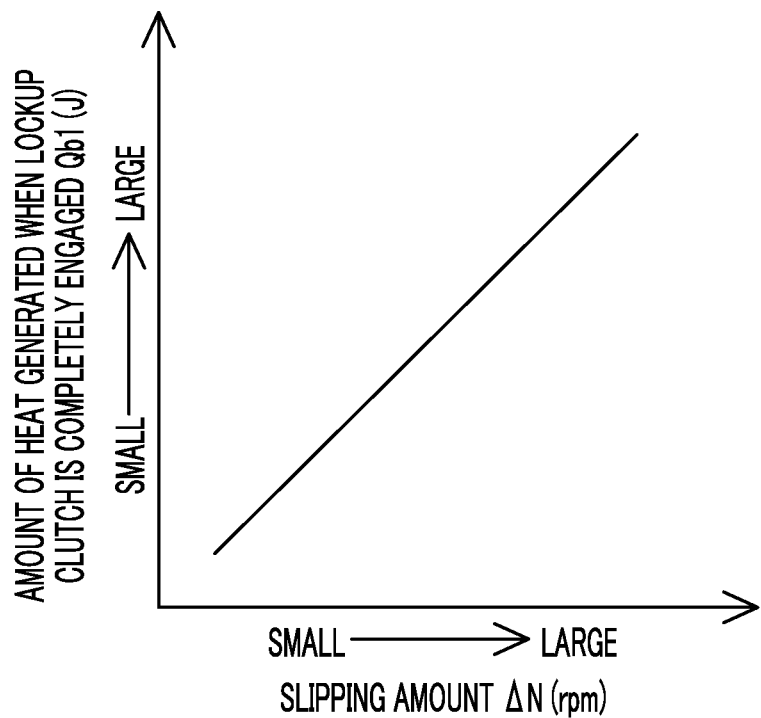
FIG. 4 is a view that show an example of a map for obtaining the amount of heat that is generated in the lockup clutch in the period from the state of lockup engagement control to when the lockup clutch is completely engaged on the basis of a slip amount of the lockup clutch in a heat generation amount estimation unit provided in the electronic control unit shown in FIG. 3.
Figure 5:
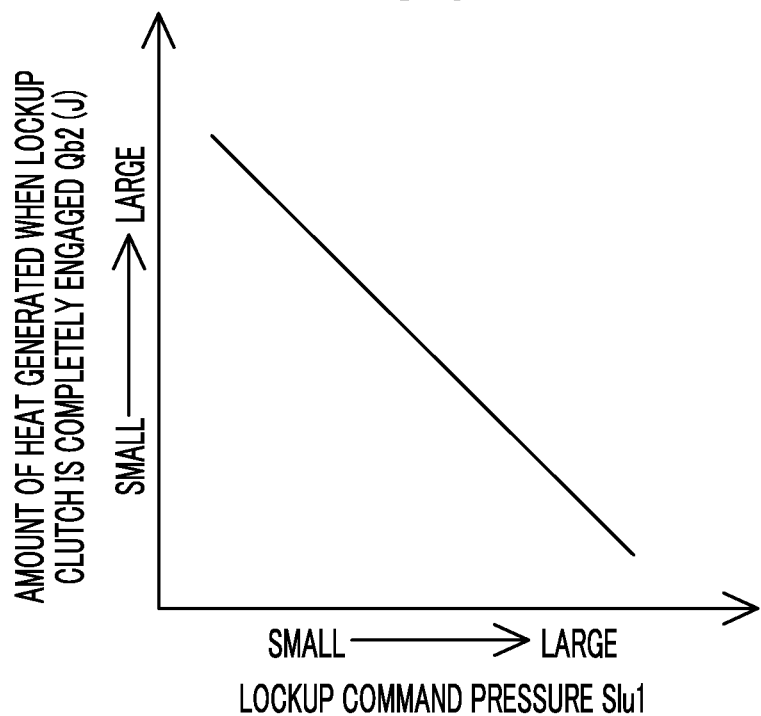
FIG. 5 is a view that shows an example of a map for obtaining the amount of heat that is generated in the lockup clutch in the period from the state of lockup engagement control to when the lockup clutch is completely engaged on the basis of a lockup command pressure in the heat generation amount estimation unit provided in the electronic control unit shown in FIG. 3.

For example, the heat generation amount estimation unit 78a calculates a heat generation amount Qb1 (J) that is generated in the lockup clutch 18l in the period up to when the lockup clutch 18l is completely engaged from the state of the lockup engagement control by consulting the map shown in FIG. 4 on the basis of an actual slip amount ΔN (rpm) at the time when the protection control execution determination unit 76 determines that it is required to execute any one of the completely engaging protection control and the releasing protection control. The heat generation amount estimation unit 78a calculates a heat generation amount Qb2 that is generated in the lockup clutch 18l in the period up to when the lockup clutch 18l is completely engaged from the state of the lockup engagement control by consulting the map shown in FIG. 5 on the basis of an actual differential pressure ΔP of the lockup clutch 18l, that is, a lockup command pressure Slu1, at the time when the protection control execution determination unit 76 determines that it is required to execute any one of the completely engaging protection control and the releasing protection control. Then, the heat generation amount estimation unit 78a adds up those heat generation amounts Qb1, Qb2 (Qb1+Qb2). Thus, the heat generation amount estimation unit 78a estimates the completely engaging heat generation amount Qb (J). The map shown in FIG. 4 is set such that the completely engaging heat generation amount Qb, that is, the heat generation amount Qb1, increases with an increase in the actual slip amount ΔN (rpm) at the time when the protection control execution determination unit 76 determines that it is required to execute any one of the completely engaging protection control and the releasing protection control. That is, the heat generation amount estimation unit 78a estimates the completely engaging heat generation amount Qb such that the completely engaging heat generation amount Qb increases with an increase in the actual slip amount ΔN (rpm) at the time when the protection control execution determination unit 76 determines that it is required to execute any one of the completely engaging protection control and the releasing protection control. The map shown in FIG. 5 is set such that the completely engaging heat generation amount Qb, that is, the heat generation amount Qb2, reduces with an increase in the actual lockup command pressure Slu1 at the time when the protection control execution determination unit 76 determines that it is required to execute any one of the completely engaging protection control and the releasing protection control. That is, the heat generation amount estimation unit 78a estimates the completely engaging heat generation amount Qb such that the completely engaging heat generation amount Qb reduces with an increase in the actual lockup command pressure Slu1 at the time when the protection control execution determination unit 76 determines that it is required to execute at least one of the completely engaging protection control and the releasing protection control.

Figure 6:
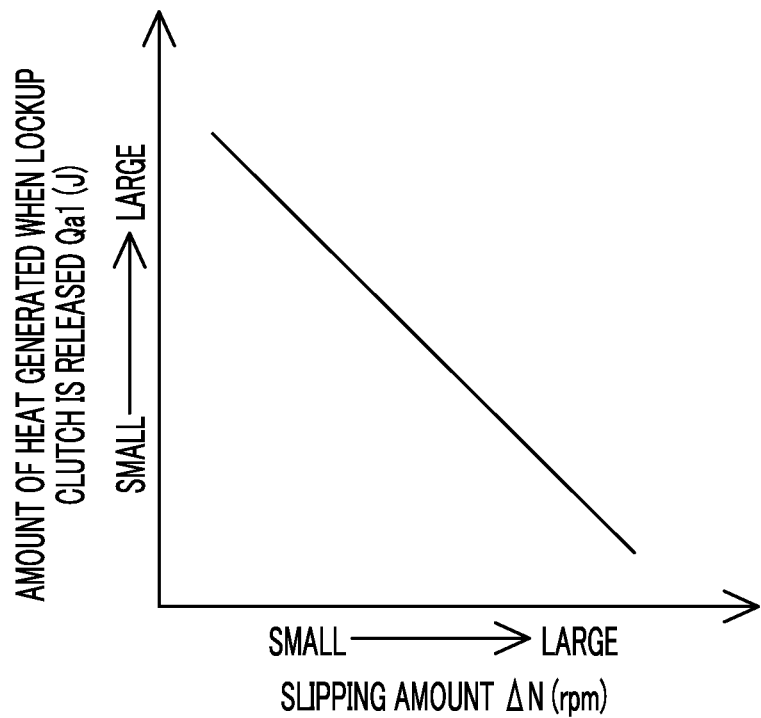
FIG. 6 is a view that shows an example of a map for obtaining the amount of heat that is generated in the lockup clutch in the period from the state of lockup engagement control to when the lockup clutch is released on the basis of a slip amount of the lockup clutch in the heat generation amount estimation unit provided in the electronic control unit shown in FIG. 3.
Figure 7:
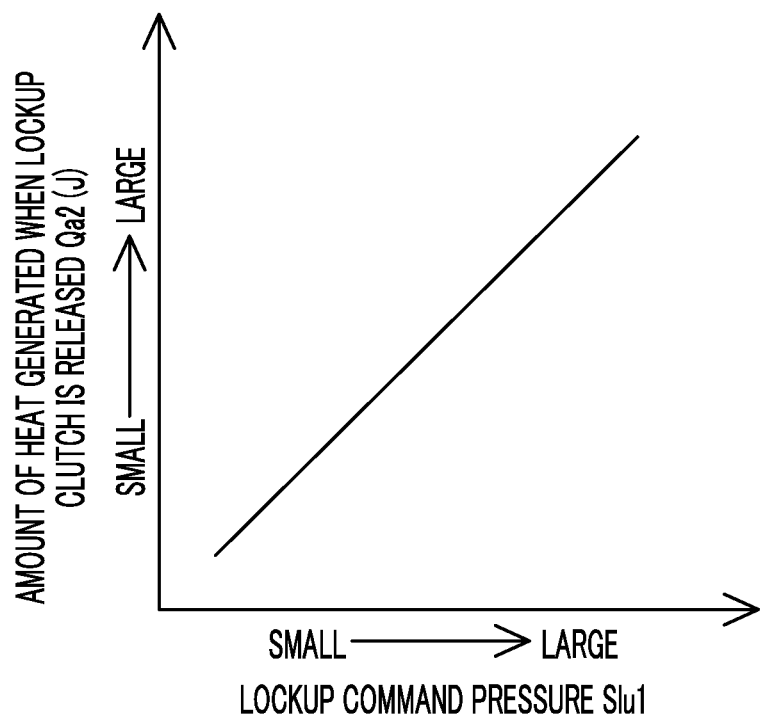
FIG. 7 is a view that shows an example of a map for obtaining the amount of heat that is generated in the lockup clutch in the period from the state of lockup engagement control to when the lockup clutch is released on the basis of a lockup command pressure in the heat generation amount estimation unit provided in the electronic control unit shown in FIG. 3.

The heat generation amount estimation unit 78a calculates a heat generation amount Qa1 (J) that is generated in the lockup clutch 18l in the period up to when the lockup clutch 18l is released from the state of the lockup engagement control by consulting the map shown in FIG. 6 on the basis of the actual slip amount ΔN (rpm) at the time when the protection control execution determination unit 76 determines that it is required to execute any one of the completely engaging protection control and the releasing protection control. The heat generation amount estimation unit 78a calculates a heat generation amount Qa2 (J) that is generated in the lockup clutch 18l in the period up to when the lockup clutch 18l is released from the state of the lockup engagement control by consulting the map shown in FIG. 7 on the basis of the actual differential pressure ΔP of the lockup clutch 18l, that is, the lockup command pressure Slu1, at the time when the protection control execution determination unit 76 determines that it is required to execute any one of the completely engaging protection control and the releasing protection control. Then, the heat generation amount estimation unit 78a adds up those heat generation amounts Qa1, Qa2 (Qa1+Qa2). Thus, the heat generation amount estimation unit 78a estimates the releasing heat generation amount Qa (J). The map shown in FIG. 6 is set such that the releasing heat generation amount Qa, that is, the heat generation amount Qa1, reduces with an increase in the actual slip amount ΔN (rpm) at the time when the protection control execution determination unit 76 determines that it is required to execute any one of the completely engaging protection control and the releasing protection control. That is, the heat generation amount estimation unit 78a estimates the releasing heat generation amount Qa such that the releasing heat generation amount Qa reduces with an increase in the actual slip amount ΔN (rpm) at the time when the protection control execution determination unit 76 determines that it is required to execute any one of the completely engaging protection control and the releasing protection control. The map shown in FIG. 7 is set such that the releasing heat generation amount Qa, that is, the heat generation amount Qa2, increases with an increase in the actual lockup command pressure Slu1 at the time when the protection control execution determination unit 76 determines that it is required to execute any one of the completely engaging protection control and the releasing protection control. That is, the heat generation amount estimation unit 78a estimates the releasing heat generation amount Qa such that the releasing heat generation amount Qa increases with an increase in the actual lockup command pressure Slu1 at the time when the protection control execution determination unit 76 determines that it is required to execute any one of the completely engaging protection control and the releasing protection control.

After the heat generation amount estimation unit 78a estimates the completely engaging heat generation amount Qb (J) and the releasing heat generation amount Qa (J), the protection control selection unit 78 compares the estimated completely engaging heat generation amount Qb (J) with the estimated releasing heat generation amount Qa (J), and selects one of the completely engaging protection control and the releasing protection control, by which the amount of heat that is generated in the lockup clutch 18l is reduced. For example, the protection control selection unit 78 compares the completely engaging heat generation amount Qb (J) estimated by the heat generation amount estimation unit 78a with the releasing heat generation amount Qa (J) estimated by the heat generation amount estimation unit 78a. When the completely engaging heat generation amount Qb (J) is larger than the releasing heat generation amount Qa (J), the protection control selection unit 78 selects the releasing protection control. When the completely engaging heat generation amount Qb (J) is smaller than or equal to the releasing heat generation amount Qa (J), the protection control selection unit 78 selects the completely engaging protection control.

Figure 8:
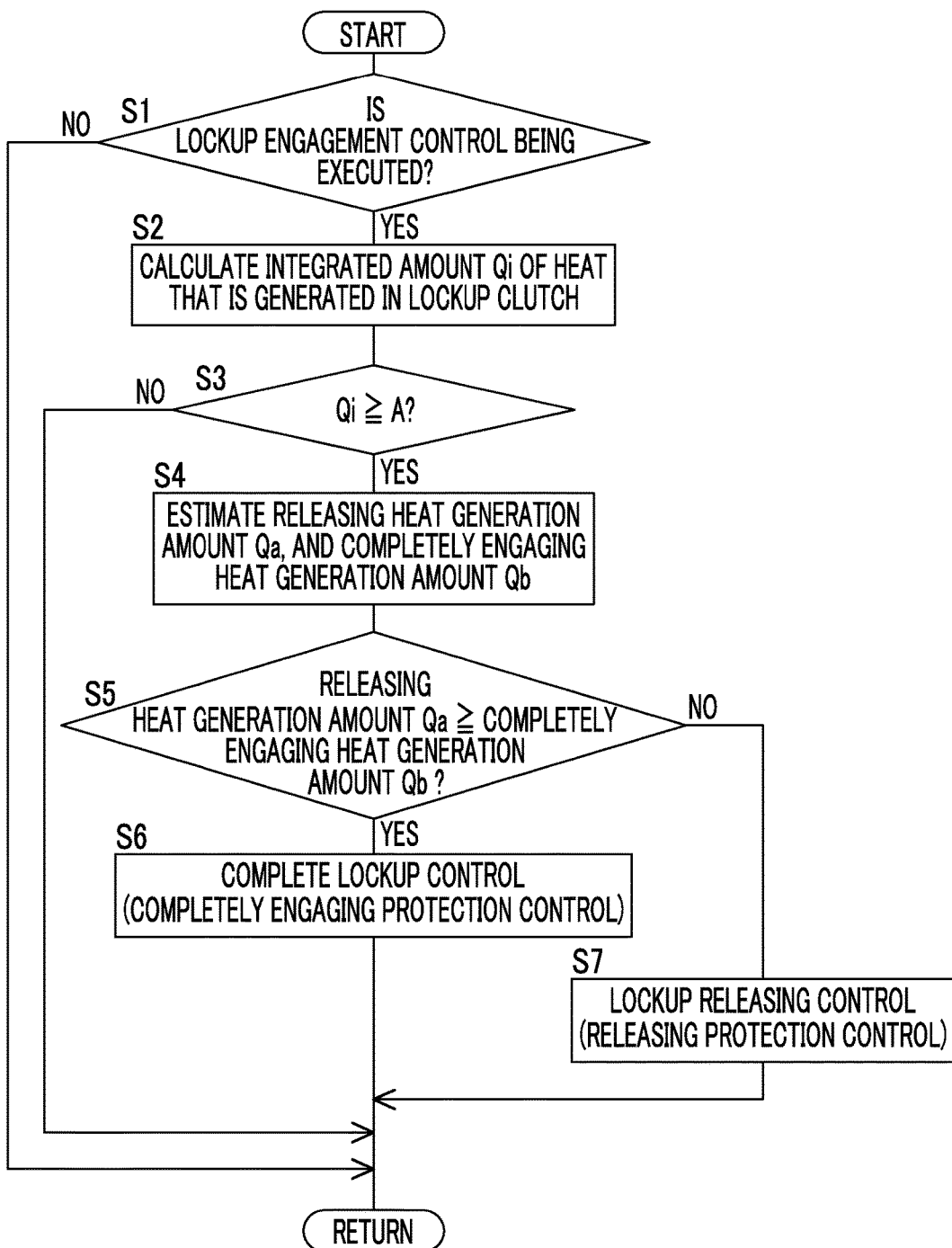
FIG. 8 is a flowchart that illustrates an example of control operations of control for selecting completely engaging protection control and releasing protection control during execution of lockup engagement control in the electronic control unit shown in FIG. 3.

FIG. 8 is a flowchart that illustrates an example of control operations of control for selecting one of the completely engaging protection control and the releasing protection control during execution of the lockup engagement control in the electronic control unit 50.

Initially, in step (hereinafter, step is omitted) S1 corresponding to the function of the lockup engagement control execution status determination unit 72, it is determined whether the lockup engagement control for controlling the differential pressure ΔP of the lockup clutch 18l such that the lockup clutch 18l is half-engaged is being executed. When negative determination is made in S1, the routine is ended. When affirmative determination is made in S1, S2 corresponding to the function of the integrated heat generation amount calculation unit 74 is executed. In S2, the integrated amount Qi (J) of heat that is generated in the lockup clutch 18l during execution of the lockup engagement control is calculated.

Subsequently, in S3 corresponding to the function of the protection control execution determination unit 76, it is determined whether it is required to execute any one of the completely engaging protection control and the releasing protection control, that is, whether the integrated amount Qi of heat generated, calculated in S2, is larger than or equal to the heat generation amount determination value A. When negative determination is made in S3, the routine is ended. When affirmative determination is made in S3, S4 corresponding to the function of the heat generation amount estimation unit 78a is executed. In S4, the completely engaging heat generation amount Qb (J) and the releasing heat generation amount Qa (J) are estimated by using, for example, the maps shown in FIG. 4 to FIG. 7 and the mathematical expressions (5) and (6).

Subsequently, in S5 corresponding to the function of the protection control selection unit 78, it is determined whether the releasing heat generation amount Qa (J) is larger than or equal to the completely engaging heat generation amount Qb (J). When affirmative determination is made in S5, that is, when the releasing heat generation amount Qa (J) is larger than or equal to the completely engaging heat generation amount Qb (J), S6 corresponding to the function of the complete lockup control unit 70a is executed. When negative determination is made in S5, that is, when the releasing heat generation amount Qa (J) is smaller than the completely engaging heat generation amount Qb (J), S7 corresponding to the function of the lockup releasing control unit 70c is executed. In S6, the complete lockup control, that is, the completely engaging protection control, is executed. In S7, the lockup releasing control, that is, the releasing protection control, is executed.

As described above, the electronic control unit 50 for the power transmission device 16 according to the present embodiment includes the protection control selection unit 78. When the integrated amount Qi of heat that is generated in the lockup clutch 18l, calculated by the integrated heat generation amount calculation unit 74, becomes larger than or equal to the heat generation amount determination value A, the protection control selection unit 78 selects control that reduces the amount of heat that is generated in the lockup clutch 18*l* from between the completely engaging heat generation amount Qb and the releasing heat generation amount Qa. The completely engaging heat generation amount Qb is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is completely engaged. The releasing heat generation amount Qa is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is released. For this reason, for example, when the releasing heat generation amount Qa that is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is released is larger than or equal to the completely engaging heat generation amount Qb that is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is completely engaged, the protection control selection unit 78 selects the completely engaging protection control by which the amount of heat that is generated in the lockup clutch 18*l* is reduced as compared to the releasing protection control. For example, when the completely engaging heat generation amount Qb that is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is completely engaged is larger than the releasing heat generation amount Qa that is generated in the lockup clutch 18*l* in the period from when the integrated amount Qi of heat generated, calculated by the integrated heat generation amount calculation unit 74, becomes larger than or equal to the predetermined heat generation amount determination value A after the start of the lockup engagement control to when the lockup clutch 18*l* is released, the protection control selection unit 78 selects the releasing protection control by which the amount of heat that is generated in the lockup clutch 18*l* is reduced as compared to the completely engaging protection control. Thus, an increase in the temperature of the lockup clutch 18*l* at the time when the lockup clutch 18*l* is completely engaged or released from the state of the lockup engagement control is suitably suppressed.

With the electronic control unit 50 for the power transmission device 16 according to the present embodiment, the protection control selection unit 78 includes the heat generation amount estimation unit 78*a*. The heat generation amount estimation unit 78*a* estimates the completely engaging heat generation amount Qb and the releasing heat generation amount Qa by using an actual slip amount ΔN (rpm) at the time when the protection control execution determination unit 76 determines that it is required to execute any one of the completely engaging protection control and the releasing protection control and an actual lockup command pressure Slu1 at the time when the protection control execution determination unit 76 determines that it is required to execute any one of the completely engaging protection control and the releasing protection control. The protection control selection unit 78 compares the completely engaging heat generation amount Qb estimated by the heat generation amount estimation unit 78*a* with the releasing heat generation amount Qa estimated by the heat generation amount estimation unit 78*a*, and selects one of the completely engaging protection control and the releasing protection control, by which the amount of heat that is generated in the lockup clutch 18*l* is reduced. For this reason, for example, when the releasing heat generation amount Qa estimated by the heat generation amount estimation unit 78*a* is larger than or equal to the completely engaging heat generation amount Qb estimated by the heat generation amount estimation unit 78*a*, the protection control selection unit 78 selects the completely engaging protection control by which the amount of heat that is generated in the lockup clutch 18*l* is reduced as compared to the releasing protection control. On the other hand, for example, when the completely engaging heat generation amount Qb estimated by the heat generation amount estimation unit 78*a* is larger than the releasing heat generation amount Qa estimated by the heat generation amount estimation unit 78*a*, the protection control selection unit 78 selects the releasing protection control by which the amount of heat that is generated in the lockup clutch 18*l* is reduced as compared to the completely engaging protection control. Thus, an increase in the temperature of the lockup clutch 18*l* at the time when the lockup clutch 18*l* is completely engaged or released from the state of the lockup engagement control is suitably suppressed.

With the electronic control unit 50 for the power transmission device 16 according to the present embodiment, the heat generation amount estimation unit 78*a* estimates the completely engaging heat generation amount Qb such that the completely engaging heat generation amount Qb increases with an increase in the slip amount ΔN at the time when the integrated amount Qi of heat generated, calculated by the integrated heat generation amount calculation unit 74, becomes larger than or equal to the heat generation amount determination value A, and estimates the releasing heat generation amount Qa such that the releasing heat generation amount Qa reduces with an increase in the slip amount ΔN at the time when the integrated amount Qi of heat generated, calculated by the integrated heat generation amount calculation unit 74, becomes larger than or equal to the heat generation amount determination value A. For this reason, it is possible to suitably estimate the amount of heat that is generated in the lockup clutch 18*l* on the basis of the slip amount ΔN at the time when the integrated amount Qi of heat generated, calculated by the integrated heat generation amount calculation unit 74, becomes larger than or equal to the heat generation amount determination value A.

With the electronic control unit 50 for the power transmission device 16 according to the present embodiment, the heat generation amount estimation unit 78*a* estimates the completely engaging heat generation amount Qb such that the completely engaging heat generation amount Qb reduces with an increase in the lockup command pressure Slu1 of the lockup clutch 18*l* at the time when the integrated amount Qi of heat generated, calculated by the integrated heat generation amount calculation unit 74, becomes larger than or equal to the heat generation amount determination value A, and estimates the releasing heat generation amount Qa such that the releasing heat generation amount Qa increases with an increase in the lockup command pressure Slu1 of the lockup clutch 18*l* at the time when the integrated amount Qi of heat generated, calculated by the integrated heat generation amount calculation unit 74, becomes larger than or equal to the heat generation amount determination value A. For this reason, it is possible to suitably estimate the amount of heat that is generated in the lockup clutch 18*l* on the basis of the lockup command pressure Slu1 of the lockup clutch 18*l* at the time when the integrated amount Qi of heat generated, calculated by the integrated heat generation amount calculation unit 74, becomes larger than or equal to the heat generation amount determination value A.

Next, a second embodiment of the disclosure will be described. Like reference numerals denote portions common to those of the above-described first embodiment, and the description thereof is omitted.

Figure 9:
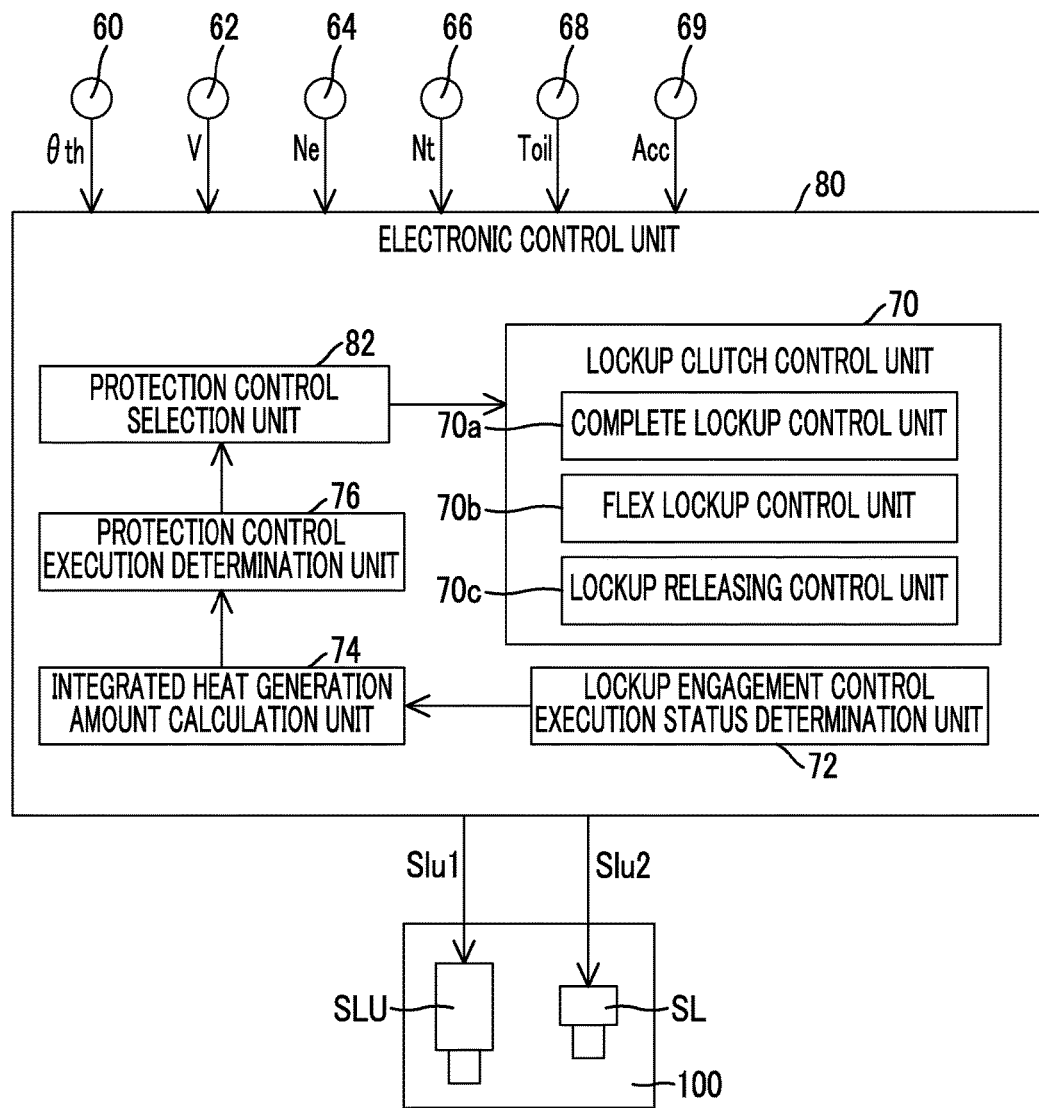
FIG. 9 is a functional block diagram that illustrates a relevant portion of control functions provided in an electronic control unit according to a second embodiment of the disclosure.
Figure 10:
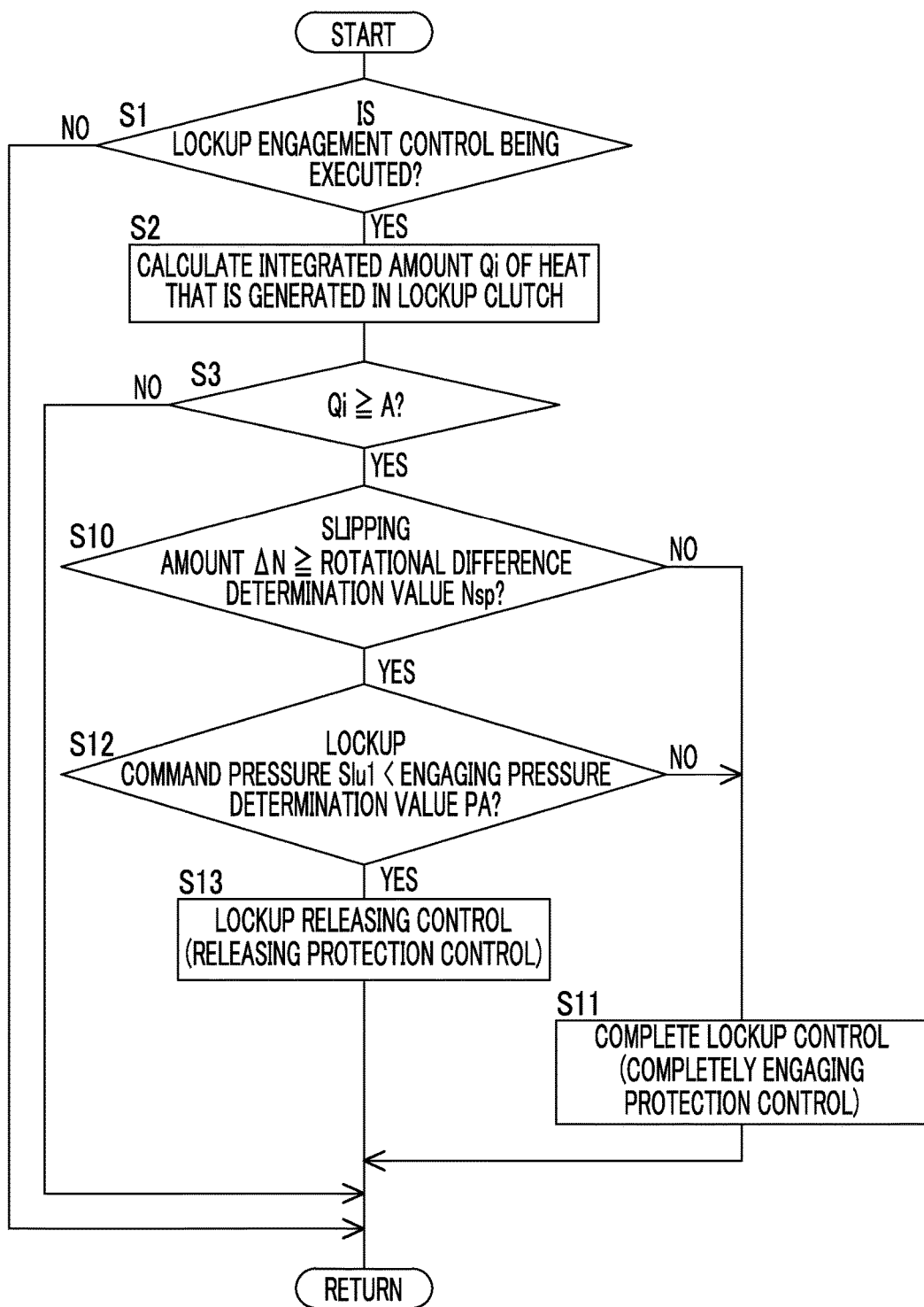
FIG. 10 is a flowchart that illustrates an example of control operations of control for selecting one of the completely engaging protection control and the releasing protection control during execution of lockup engagement control in the electronic control unit shown in FIG. 9.

FIG. 9 and FIG. 10 are views that illustrate an electronic control unit (control system) 80 according to the second embodiment of the disclosure. The electronic control unit 80 according to the present embodiment differs from the electronic control unit 50 according to the first embodiment in the function of a protection control selection unit (selection unit) 82, and the remaining configuration is substantially the same as that of the electronic control unit 50 according to the first embodiment.

FIG. 9 is a view that shows the input/output system of the electronic control unit 80, and shows functional blocks that illustrate a relevant portion of control functions implemented by the electronic control unit 80. When the protection control execution determination unit 76 determines that it is required to execute any one of the completely engaging protection control and the releasing protection control, the protection control selection unit 82 selects one of the completely engaging heat generation amount Qb (J) and the releasing heat generation amount Qa (J), by which the amount of heat that is generated in the lockup clutch 18*l* is reduced. The completely engaging heat generation amount Qb (J) is generated in the lockup clutch 18*l* in the period from when the protection control execution determination unit 76 determines that it is required to execute any one of the completely engaging protection control and the releasing protection control after the start of the lockup engagement control (when the integrated amount Qi of heat generated, calculated by the integrated heat generation amount calculation unit 74, becomes larger than or equal to the predetermined heat generation amount determination value A after the start of the lockup engagement control) to when the lockup clutch 18*l* is completely engaged. The releasing heat generation amount Qa (J) is generated in the lockup clutch 18*l* in the period from when the protection control execution determination unit 76 determines that it is required to execute any one of the completely engaging protection control and the releasing protection control after the start of the lockup engagement control to when the lockup clutch 18*l* is released. When the protection control selection unit 82 selects the completely engaging protection control, the complete lockup control unit 70*a* executes complete lockup control. When the protection control selection unit 82 selects the releasing protection control, the lockup releasing control unit 70*c* executes lockup releasing control.

When an actual slip amount ΔN (rpm) at the time when the integrated amount Qi of heat generated, calculated by the integrated heat generation amount calculation unit 74, becomes larger than or equal to the heat generation amount determination value A is smaller than a predetermined rotational difference determination value Nsp (rpm) or when an actual differential pressure ΔP of the lockup clutch 18*l*, that is, the lockup command pressure Slu1, at the time when the integrated amount Qi of heat generated, calculated by the integrated heat generation amount calculation unit 74, becomes larger than or equal to the heat generation amount determination value A is higher than or equal to a predetermined engaging pressure determination value PA, the protection control selection unit 82 selects the completely engaging protection control. When the actual slip amount ΔN (rpm) at the time when the integrated amount Qi of heat generated, calculated by the integrated heat generation amount calculation unit 74, becomes larger than or equal to the heat generation amount determination value A is larger than or equal to the rotational difference determination value Nsp (rpm) and the actual differential pressure ΔP of the lockup clutch 18*l*, that is, the lockup command pressure Slu1, at the time when the integrated amount Qi of heat generated, calculated by the integrated heat generation amount calculation unit 74, becomes larger than or equal to the heat generation amount determination value A is lower than the engaging pressure determination value PA, the protection control selection unit 82 selects the releasing protection control. The rotational difference determination value Nsp and the engaging pressure determination value PA are set to the rotational difference ΔN and the lockup command pressure Slu1 by experiment, or the like, in advance as follows. The releasing heat generation amount Qa is larger than the completely engaging heat generation amount Qb when the actual slip amount ΔN (rpm) at the time when the integrated amount Qi of heat generated, calculated by the integrated heat generation amount calculation unit 74, becomes larger than or equal to the heat generation amount determination value A is smaller than the rotational difference determination value Nsp (rpm) or when the actual lockup command pressure Slu1 at the time when the integrated amount Qi of heat generated, calculated by the integrated heat generation amount calculation unit 74, becomes larger than or equal to the heat generation amount determination value A is higher than or equal to the engaging pressure determination value PA. In addition, the completely engaging heat generation amount Qb is larger than the releasing heat generation amount Qa when the actual slip amount ΔN (rpm) at the time when the integrated amount Qi of heat generated, calculated by the integrated heat generation amount calculation unit 74, becomes larger than or equal to the heat generation amount determination value A is larger than or equal to the rotational difference determination value Nsp (rpm) and the actual lockup command pressure Slu1 at the time when the integrated amount Qi of heat generated, calculated by the integrated heat generation amount calculation unit 74, becomes larger than or equal to the heat generation amount determination value A is smaller than the engaging pressure determination value PA.

FIG. 10 is a flowchart that illustrates an example of control operations of control for selecting one of the completely engaging protection control and the releasing protection control during execution of the lockup engagement control in the electronic control unit 80. S1 to S3 of the flowchart of FIG. 10 are the same as S1 to S3 of the flowchart of FIG. 8 in the first embodiment, so the description of S1 to S3 is omitted in the second embodiment.

In S10 corresponding to the function of the protection control selection unit 82, it is determined whether the actual slip amount ΔN at the time when the integrated amount Qi of heat generated becomes larger than or equal to the heat generation amount determination value A in S3 is larger than or equal to the rotational difference determination value Nsp. When negative determination is made in S10, that is, when the actual slip amount ΔN is smaller than the rotational difference determination value Nsp, S11 corresponding to the function of the complete lockup control unit 70a is executed. When affirmative determination is made in S10, that is, when the actual slip amount ΔN is larger than or equal to the rotational difference determination value Nsp, S12 corresponding to the function of the protection control selection unit 82 is executed. In S11, the complete lockup control, that is, the completely engaging protection control, is executed. In S12, it is determined whether the actual lockup command pressure Slu1 at the time when the integrated amount Qi of heat generated becomes larger than or equal to the heat generation amount determination value A in S3 is lower than the engaging pressure determination value PA. When negative determination is made in S12, that is, when the lockup command pressure Slu1 is higher than or equal to the engaging pressure determination value PA, S11 is executed. When affirmative determination is made in S12, that is, when the lockup command pressure Slu1 is lower than the engaging pressure determination value PA, S13 corresponding to the function of the lockup releasing control unit 70c is executed. In S13, the lockup releasing control, that is, the releasing protection control, is executed.

As described above, with the electronic control unit 80 for the power transmission device 16 according to the present embodiment, the protection control selection unit 82 selects the completely engaging protection control when the slip amount ΔN at the time when the integrated amount Qi of heat generated, calculated by the integrated heat generation amount calculation unit 74, becomes larger than or equal to the heat generation amount determination value A is smaller than the rotational difference determination value Nsp or when the lockup command pressure Slu1 at the time when the integrated amount Qi of heat generated, calculated by the integrated heat generation amount calculation unit 74, becomes larger than or equal to the heat generation amount determination value A is higher than or equal to the engaging pressure determination value PA, and selects the releasing protection control when the slip amount ΔN at the time when the integrated amount Qi of heat generated, calculated by the integrated heat generation amount calculation unit 74, becomes larger than or equal to the heat generation amount determination value A is larger than or equal to the rotational difference determination value Nsp and the lockup command pressure Slu1 at the time when the integrated amount Qi of heat generated, calculated by the integrated heat generation amount calculation unit 74, becomes larger than or equal to the heat generation amount determination value A is lower than the engaging pressure determination value PA. Thus, the amount of heat that is generated in the lockup clutch 18l is reduced. For this reason, for example, when the slip amount ΔN is smaller than the rotational difference determination value Nsp or when the lockup command pressure Slu1 is higher than or equal to the engaging pressure determination value PA, that is, when the releasing heat generation amount Qa is larger than the completely engaging heat generation amount Qb, the protection control selection unit 82 selects the completely engaging protection control by which the amount of heat that is generated in the lockup clutch 18l is reduced as compared to the releasing protection control. In addition, for example, when the slip amount ΔN is larger than or equal to the rotational difference determination value Nsp and the lockup command pressure Slu1 is lower than the engaging pressure determination value PA, that is, when the completely engaging heat generation amount Qb is larger than the releasing heat generation amount Qa, the protection control selection unit 82 selects the releasing protection control by which the amount of heat that is generated in the lockup clutch 18l is reduced as compared to the completely engaging protection control. Thus, an increase in the temperature of the lockup clutch 18l at the time when the lockup clutch 18l is completely engaged or released from the state of the lockup engagement control is suitably suppressed.

The embodiments of the disclosure are described in detail with reference to the accompanying drawings; however, the disclosure is also applied to other embodiments.

For example, in the above-described embodiments, the integrated heat generation amount calculation unit 74 calculates the integrated amount Qi of heat that is generated in the lockup clutch 18l during the lockup engagement control by using the above-described mathematical expressions (1) to (4). Instead, for example, the integrated amount Qi of heat that is generated in the lockup clutch 18l may be calculated by using an integrated amount calculation expression other than the above-described mathematical expressions (1) to (4). Furthermore, the temperature of the lockup clutch 18l may be directly measured by a temperature sensor, and the integrated amount Qi of heat that is generated in the lockup clutch 18l may be calculated on the basis of the measured temperature.

In the above-described embodiments, the heat generation amount estimation unit 78a estimates the completely engaging heat generation amount Qb (J) and the releasing heat generation amount Qa (J) by consulting the maps shown in FIG. 4 to FIG. 7 on the basis of the slip amount ΔN and the lockup command pressure Slu1 at the time when the integrated amount Qi of heat generated, calculated by the integrated heat generation amount calculation unit 74, becomes larger than or equal to the heat generation amount determination value A. Instead, for example, the heat generation amount estimation unit 78a may estimate the completely engaging heat generation amount Qb (J) and the releasing heat generation amount Qa (J) by consulting the map shown in FIG. 4 and the map shown in FIG. 6 on the basis of the slip amount ΔN at the time when the integrated amount Qi of heat generated, calculated by the integrated heat generation amount calculation unit 74, becomes larger than or equal to the heat generation amount determination value A. Alternatively, the heat generation amount estimation unit 78a may estimate the completely engaging heat generation amount Qb (J) and the releasing heat generation amount Qa (J) by consulting the map shown in FIG. 5 and the map shown in FIG. 7 on the basis of the lockup command pressure Slu1 at the time when the integrated amount Qi of heat generated, calculated by the integrated heat generation amount calculation unit 74, becomes larger than or equal to the heat generation amount determination value A. Furthermore, a method other than the above-described methods may be used. For example, the completely engaging heat generation amount Qb and the releasing heat generation amount Qa may be estimated by using a mathematical expression, or the like, including the slip amount ΔN and the lockup command pressure Slu1 at the time when the integrated amount Qi of heat generated, calculated by the integrated heat generation amount calculation unit 74, becomes larger than or equal to the heat generation amount determination value A.

In the above-described embodiments, the vehicle 10 includes the torque converter 18. Instead, the vehicle 10 may include a fluid coupling, or the like, having no torque amplification action instead of the torque converter 18.

The above-described embodiments are only illustrative. The disclosure may be implemented in modes including various modifications or improvements on the basis of the knowledge of persons skilled in the art.

The embodiments may be defined as follows. A control system for a power transmission device for a vehicle is provided. The power transmission device includes a fluid coupling. The fluid coupling includes a lockup clutch, an input member and an output member. The fluid coupling is configured such that the input member and the output member are directly coupled to each other when the lockup clutch is engaged. The control system includes an electronic control unit. The electronic control unit is configured to i) execute engagement control for controlling an engaging pressure of the lockup clutch such that the lockup clutch is half-engaged, ii) calculate an integrated amount of heat that is generated in the lockup clutch during the engagement control, and iii) when the integrated amount of heat generated becomes larger than or equal to a predetermined determination value, select one of first control for completely engaging the lockup clutch from a state of the engagement control and second control for releasing the lockup clutch from the state of the engagement control such that a smaller one of a first amount of heat that is generated in the lockup clutch in a period from when the integrated amount of heat generated becomes larger than or equal to the predetermined determination value after a start of the engagement control to when the lockup clutch is completely engaged and a second amount of heat that is generated in the lockup clutch in a period from when the integrated amount of heat generated becomes larger than or equal to the predetermined determination value after the start of the engagement control to when the lockup clutch is released is generated in the lockup clutch.

The electronic control unit may be configured to estimate the first amount of heat generated and the second amount of heat generated by using at least one of a rotational difference between the input member and the output member at the time when the integrated amount of heat generated becomes larger than or equal to the predetermined determination value and the engaging pressure of the lockup clutch at the time when the integrated amount of heat generated becomes larger than or equal to the predetermined determination value, and select one of the first control and the second control on the basis of a comparison between the first amount of heat generated and the second amount of heat generated.

The electronic control unit may be configured to when a rotational difference between the input member and the output member at the time when the integrated amount of heat generated becomes larger than or equal to the predetermined determination value is smaller than a predetermined rotational difference determination value, select the first control, and when the rotational difference between the input member and the output member at the time when the integrated amount of heat generated becomes larger than or equal to the predetermined determination value is larger than or equal to the rotational difference determination value and the engaging pressure of the lockup clutch at the time when the integrated amount of heat generated becomes larger than or equal to the predetermined determination value is lower than a predetermined engaging pressure determination value, select the second control.

The electronic control unit may be configured to, when the engaging pressure of the lockup clutch at the time when the integrated amount of heat generated becomes larger than or equal to the predetermined determination value is higher than or equal to a predetermined engaging pressure determination value, select the first control, and when a rotational difference between the input member and the output member at the time when the integrated amount of heat generated becomes larger than or equal to the predetermined determination value is larger than or equal to a rotational difference determination value and the engaging pressure of the lockup clutch at the time when the integrated amount of heat generated becomes larger than or equal to the predetermined determination value is lower than the engaging pressure determination value, select the second control.

The electronic control unit may be configured to estimate the first amount of heat generated such that the first amount of heat generated increases with an increase in the rotational difference between the input member and the output member at the time when the integrated amount of heat generated becomes larger than or equal to the predetermined determination value, and estimate the second amount of heat generated such that the second amount of heat generated reduces with an increase in the rotational difference between the input member and the output member at the time when the integrated amount of heat generated becomes larger than or equal to the predetermined determination value.

The electronic control unit may be configured to estimate the first amount of heat generated such that the first amount of heat generated reduces with an increase in the engaging pressure of the lockup clutch at the time when the integrated amount of heat generated becomes higher than or equal to the predetermined determination value, and estimate the second amount of heat generated such that the second amount of heat generated increases with an increase in the engaging pressure of the lockup clutch at the time when the integrated amount of heat generated becomes larger than or equal to the predetermined determination value.

A control system for a power transmission device for a vehicle is provided. The power transmission device includes a fluid coupling. The fluid coupling includes a lockup clutch, an input member and an output member. The fluid coupling is configured such that the input member and the output member are directly coupled to each other when the lockup clutch is engaged. The control system includes an electronic control unit. The electronic control unit is configured to i) execute engagement control for controlling an engaging pressure of the lockup clutch such that the lockup clutch is half-engaged, ii) calculate an integrated amount of heat that is generated in the lockup clutch during the engagement control, iii) when the integrated amount of heat generated becomes larger than or equal to a predetermined determination value, estimate the first amount of heat that is generated in the lockup clutch in a period from when the integrated amount of heat generated becomes larger than or equal to the predetermined determination value after a start of the engagement control to when the lockup clutch is completely engaged, iv) when the integrated amount of heat generated becomes larger than or equal to the predetermined determination value, estimate the second amount of heat that is generated in the lockup clutch in a period from when the integrated amount of heat generated becomes larger than or equal to the predetermined determination value after the start of the engagement control to when the lockup clutch is released, v) when the first amount of heat generated is smaller than or equal to the second amount of heat generated, execute first control for completely engaging the lockup clutch from a state of the engagement control, and vi) when the second amount of heat generated is smaller than the first amount of heat generated, execute second control for releasing the lockup clutch from the state of the engagement control.

The electronic control unit may be configured to estimate the first amount of heat generated and the second amount of heat generated by using at least one of a rotational difference between the input member and the output member at the time when the integrated amount of heat generated becomes larger than or equal to the predetermined determination value and the engaging pressure of the lockup clutch at the time when the integrated amount of heat generated becomes larger than or equal to the predetermined determination value.

The electronic control unit may be configured to estimate the first amount of heat generated such that the first amount of heat generated increases with an increase in the rotational difference between the input member and the output member at the time when the integrated amount of heat generated becomes larger than or equal to the predetermined determination value, and estimate the second amount of heat generated such that the second amount of heat generated reduces with an increase in the rotational difference between the input member and the output member at the time when the integrated amount of heat generated becomes larger than or equal to the predetermined determination value.

The electronic control unit may be configured to estimate the first amount of heat generated such that the first amount of heat generated reduces with an increase in the engaging pressure of the lockup clutch at the time when the integrated amount of heat generated becomes higher than or equal to the predetermined determination value, and estimate the second amount of heat generated such that the second amount of heat generated increases with an increase in the engaging pressure of the lockup clutch at the time when the integrated amount of heat generated becomes larger than or equal to the predetermined determination value.

What is claimed is:

1. A control system for a power transmission device for a vehicle, the power transmission device including a fluid coupling, the fluid coupling including a lockup clutch, an input member and an output member, the fluid coupling being configured such that the input member and the output member are directly coupled to each other when the lockup clutch is engaged, the control system comprising:
    an electronic control unit configured to
        i) execute engagement control for controlling an engaging pressure of the lockup clutch such that the lockup clutch is half-engaged,
        ii) calculate an integrated amount of heat that is generated in the lockup clutch during the engagement control, and
        iii) when the integrated amount of heat generated becomes larger than or equal to a predetermined determination value, select one of first control for completely engaging the lockup clutch from a state of the engagement control and second control for releasing the lockup clutch from the state of the engagement control such that a smaller one of a first amount of heat that is generated in the lockup clutch in a period from when the integrated amount of heat generated becomes larger than or equal to the predetermined determination value after a start of the engagement control to when the lockup clutch is completely engaged and a second amount of heat that is generated in the lockup clutch in a period from when the integrated amount of heat generated becomes larger than or equal to the predetermined determination value after the start of the engagement control to when the lockup clutch is released is generated in the lockup clutch.

2. The control system according to claim 1, wherein the electronic control unit is configured to
    estimate the first amount of heat generated and the second amount of heat generated by using at least one of a rotational difference between the input member and the output member at the time when the integrated amount of heat generated becomes larger than or equal to the predetermined determination value and the engaging pressure of the lockup clutch at the time when the integrated amount of heat generated becomes larger than or equal to the predetermined determination value, and
    select one of the first control and the second control based on a comparison between the first amount of heat generated and the second amount of heat generated.

3. The control system according to claim 2, wherein the electronic control unit is configured to
    estimate the first amount of heat generated such that the first amount of heat generated increases with an increase in the rotational difference between the input member and the output member at the time when the integrated amount of heat generated becomes larger than or equal to the predetermined determination value, and
    estimate the second amount of heat generated such that the second amount of heat generated reduces with an increase in the rotational difference between the input member and the output member at the time when the integrated amount of heat generated becomes larger than or equal to the predetermined determination value.

4. The control system according to claim 2, wherein the electronic control unit is configured to
    estimate the first amount of heat generated such that the first amount of heat generated reduces with an increase in the engaging pressure of the lockup clutch at the time when the integrated amount of heat generated becomes higher than or equal to the predetermined determination value, and
    estimate the second amount of heat generated such that the second amount of heat generated increases with an increase in the engaging pressure of the lockup clutch at the time when the integrated amount of heat generated becomes larger than or equal to the predetermined determination value.

5. The control system according to claim 1, wherein the electronic control unit is configured to
    when a rotational difference between the input member and the output member at the time when the integrated amount of heat generated becomes larger than or equal to the predetermined determination value is smaller than a predetermined rotational difference determination value, select the first control, and
    when the rotational difference between the input member and the output member at the time when the integrated amount of heat generated becomes larger than or equal to the predetermined determination value is larger than or equal to the rotational difference determination value and the engaging pressure of the lockup clutch at the time when the integrated amount of heat generated becomes larger than or equal to the predetermined determination value is lower than a predetermined engaging pressure determination value, select the second control.

6. The control system according to claim 1, wherein the electronic control unit is configured to
when the engaging pressure of the lockup clutch at the time when the integrated amount of heat generated becomes larger than or equal to the predetermined determination value is higher than or equal to a predetermined engaging pressure determination value, select the first control, and
when a rotational difference between the input member and the output member at the time when the integrated amount of heat generated becomes larger than or equal to the predetermined determination value is larger than or equal to a rotational difference determination value and the engaging pressure of the lockup clutch at the time when the integrated amount of heat generated becomes larger than or equal to the predetermined determination value is lower than the engaging pressure determination value, select the second control.

7. A control system for a power transmission device for a vehicle, the power transmission device including a fluid coupling, the fluid coupling including a lockup clutch, an input member and an output member, the fluid coupling being configured such that the input member and the output member are directly coupled to each other when the lockup clutch is engaged, the control system comprising:
an electronic control unit configured to
i) execute engagement control for controlling an engaging pressure of the lockup clutch such that the lockup clutch is half-engaged,
ii) calculate an integrated amount of heat that is generated in the lockup clutch during the engagement control,
iii) when the integrated amount of heat generated becomes larger than or equal to a predetermined determination value, estimate a first amount of heat that is generated in the lockup clutch in a period from when the integrated amount of heat generated becomes larger than or equal to the predetermined determination value after a start of the engagement control to when the lockup clutch is completely engaged,
iv) when the integrated amount of heat generated becomes larger than or equal to the predetermined determination value, estimate a second amount of heat that is generated in the lockup clutch in a period from when the integrated amount of heat generated becomes larger than or equal to the predetermined determination value after the start of the engagement control to when the lockup clutch is released,
v) when the first amount of heat generated is smaller than or equal to the second amount of heat generated, execute first control for completely engaging the lockup clutch from a state of the engagement control, and
vi) when the second amount of heat generated is smaller than the first amount of heat generated, execute second control for releasing the lockup clutch from the state of the engagement control.

8. The control system according to claim 7, wherein the electronic control unit is configured to estimate the first amount of heat generated and the second amount of heat generated by using at least one of a rotational difference between the input member and the output member at the time when the integrated amount of heat generated becomes larger than or equal to the predetermined determination value and the engaging pressure of the lockup clutch at the time when the integrated amount of heat generated becomes larger than or equal to the predetermined determination value.

9. The control system according to claim 8, wherein the electronic control unit is configured to
estimate the first amount of heat generated such that the first amount of heat generated increases with an increase in the rotational difference between the input member and the output member at the time when the integrated amount of heat generated becomes larger than or equal to the predetermined determination value, and
estimate the second amount of heat generated such that the second amount of heat generated reduces with an increase in the rotational difference between the input member and the output member at the time when the integrated amount of heat generated becomes larger than or equal to the predetermined determination value.

10. The control system according to claim 8, wherein the electronic control unit is configured to
estimate the first amount of heat generated such that the first amount of heat generated reduces with an increase in the engaging pressure of the lockup clutch at the time when the integrated amount of heat generated becomes larger than or equal to the predetermined determination value, and
estimate the second amount of heat generated such that the second amount of heat generated increases with an increase in the engaging pressure of the lockup clutch at the time when the integrated amount of heat generated becomes larger than or equal to the predetermined determination value.

* * * * *